(12) United States Patent
Ebisu et al.

(10) Patent No.: US 9,543,851 B2
(45) Date of Patent: Jan. 10, 2017

(54) MATRIX CONVERTER

(71) Applicant: KABUSHIKI KAISHA YASKAWA DENKI, Kitakyushu-shi (JP)

(72) Inventors: Joji Ebisu, Kitakyushu (JP); Akira Yamazaki, Kitakyushu (JP)

(73) Assignee: KABUSHIKI KAISHA YASKAWA DENKI, Kitakyushi-Shi (JP)

( * ) Notice: Subject to any disclaimer, the term of this patent is extended or adjusted under 35 U.S.C. 154(b) by 137 days.

(21) Appl. No.: 14/514,390

(22) Filed: Oct. 15, 2014

(65) Prior Publication Data

US 2015/0115906 A1    Apr. 30, 2015

(30) Foreign Application Priority Data

Oct. 24, 2013  (JP) ................................. 2013-221211

(51) Int. Cl.
    *H02M 5/293*    (2006.01)
    *H02M 1/00*     (2006.01)

(52) U.S. Cl.
    CPC ............... *H02M 5/293* (2013.01); *H02M 1/00* (2013.01); *H02M 2001/0054* (2013.01); *H02M 2005/2932* (2013.01); *Y02B 70/1491* (2013.01)

(58) Field of Classification Search
    CPC ............... H02M 5/293; H02M 2005/2932; H02M 5/297; H02M 2001/0003; H02M 1/00; H02M 2001/0054; H02M 3/158; H02P 21/0039; H02P 21/0003; H02P 21/0085; H02P 2203/11; Y02B 70/1491
    See application file for complete search history.

(56) References Cited

U.S. PATENT DOCUMENTS

2008/0265809 A1* 10/2008 Ol ..................... H02P 21/0003
                                                          318/139
2009/0322276 A1* 12/2009 Yamanaka ............ H02M 5/297
                                                          318/811

(Continued)

FOREIGN PATENT DOCUMENTS

JP        10-337025        12/1998

OTHER PUBLICATIONS

Jyn-icM Itoh "Direct Grid Connection of Matrix Converter with Transition Control for Flywheel UPS", Renewable Energy Research and Applicatoins, 2012 International Conference on, IEEE, Nov. 11, 2012, pp. 1-6.*

(Continued)

*Primary Examiner* — Adolf Berhane
*Assistant Examiner* — Henry Lee, III
(74) *Attorney, Agent, or Firm* — Mori & Ward, LLP

(57) ABSTRACT

A matrix converter includes: a power converter configured to couple an AC power supply and a load together; and a controller configured to selectively execute: a first control mode in which the controller is configured to perform power conversion between the AC power supply and the load; and a second control mode in which the controller is configured to directly combine the AC power supply with the load. The controller is configured to: increase the output voltage and cause a phase of the output voltage follow up a voltage phase of the AC power supply in a case where a difference between a frequency of an output voltage from the power converter to the load and a frequency of the AC power supply becomes within a predetermined range.

19 Claims, 9 Drawing Sheets

(56) References Cited

U.S. PATENT DOCUMENTS

2012/0250370 A1\* 10/2012 Taniguchi ......... H02M 3/33561
  363/34
2012/0268046 A1\* 10/2012 Yamazaki ........... H02P 21/0042
  318/400.02
2013/0336023 A1\* 12/2013 Yamanaka ............ H02M 5/458
  363/37

OTHER PUBLICATIONS

Itoh et al., "Direct Grid Connection of Matrix Converter with Transition Control for Flywheel UPS", Renewable Energy Research and Applications (ICRERA), Nov. 11, 2012, pp. 1-6, XP032342123.
Extended European Search Report for corresponding EP Application No. 14188234.0-1809, Jul. 6, 2015.
Chinese Office Action for corresponding CN Application No. 201410487065.3, Jul. 27, 2016.

\* cited by examiner

| Ai<br>(POLARITY OF ωi) | Aω<br>(POLARITY OF ω*) | BIDIRECTIONAL SWITCH S<br>TO BE TURNED ON |
|---|---|---|
| POSITIVE | POSITIVE | $S_{RW}, S_{SU}, S_{TV}$ |
| NEGATIVE | NEGATIVE | |
| POSITIVE | NEGATIVE | $S_{RW}, S_{SV}, S_{TU}$ |
| NEGATIVE | POSITIVE | | us# MATRIX CONVERTER

CROSS-REFERENCE TO RELATED APPLICATION

The present application claims priority under 35 U.S.C. §119 to Japanese Patent Application No. 2013-221211, filed Oct. 24, 2013. The contents of this application are incorporated herein by reference in their entirety.

BACKGROUND

1. Technical Field

The embodiment of the disclosure relates to a matrix converter.

2. Related Art

A matrix converter includes a plurality of bidirectional switches that couple an AC power supply and a load together. Directly switching respective phase voltages of the AC power supply by these bidirectional switches causes the output of an AC power with any voltage and frequency to the load. Theoretically, the sinusoidal voltage that can be output by this matrix converter without distortion is up to 0.866 times as large as the fundamental wave of the power supply voltage. Accordingly, it is known that there is a room for improvement of the voltage use rate of the matrix converter.

Accordingly, a proposed conventional technique performs a control in which a PWM control of the bidirectional switches is stopped and respective phases of the AC power supply are directly combined with respective phases of the load via the bidirectional switches in the case where the output frequency coincides with the frequency of the AC power supply. This causes the output of the voltage of the AC power supply directly to the load (see, for example, JP-A-10-337025). This directly combined control allows improvement of the voltage use rate in the matrix converter. Furthermore, this allows reduction in switching loss of the bidirectional switch.

SUMMARY

A matrix converter includes: a power converter that includes a plurality of bidirectional switch configured to couple respective phase of an AC power supply and respective phase of a load together; and a controller configured to selectively execute: a first control mode in which the controller is configured to perform power conversion between the AC power supply and the load by performing a PWM control on the bidirectional switches; and a second control mode in which the controller is configured to directly combine the AC power supply with the load by controlling the bidirectional switches. The controller is configured to: perform a voltage increase control and a follow-up control in a case where a difference between a frequency of an output voltage from the power converter to the load and a frequency of the AC power supply becomes within a predetermined range, the voltage increase control increasing the output voltage, the follow-up control causing a phase of the output voltage to follow up a voltage phase of the AC power supply; and make a transition of a mode for driving the bidirectional switches from the first control mode to the second control mode in a case where these controls terminate.

DETAILED DESCRIPTION

Figure 1:
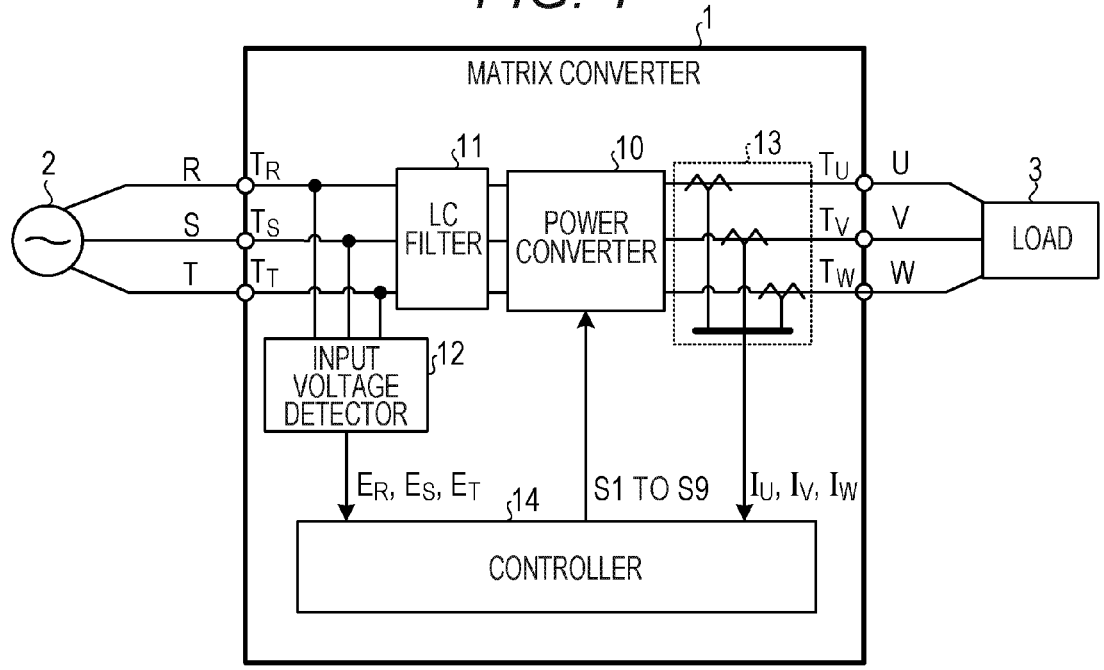
FIG. 1 is a diagram illustrating an exemplary configuration of a matrix converter according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A matrix converter includes a power converter and a controller. A power converter includes a plurality of bidirectional switch configured to couple respective phase of an AC power supply and respective phase of a load together. A controller is configured to selectively execute: a first control mode in which the controller is configured to perform power conversion between the AC power supply and the load by performing a PWM control on the bidirectional switches; and a second control mode in which the controller is configured to directly combine the AC power supply with the load by controlling the bidirectional switches. The controller is configured to: perform a voltage increase control and a follow-up control in a case where a difference between a frequency of an output voltage from the power converter to the load and a frequency of the AC power supply becomes within a predetermined range, the voltage increase control increasing the output voltage, the follow-up control causing a phase of the output voltage to follow up a voltage phase of the AC power supply; and make a transition of a mode for driving the bidirectional switches from the first control mode to the second control mode in a case where these controls terminate.

One aspect of the embodiment allows providing a matrix converter that can reduce occurrence of a shock in the output electric current and improve the voltage use rate.

The following describes the embodiment of a matrix converter disclosed in this application in detail with reference to the accompanying drawings. Here, the following embodiment does not limit the content of this disclosure.

(1. Configuration of Matrix Converter)

FIG. 1 is a diagram illustrating an exemplary configuration of the matrix converter according to the embodiment. As illustrated in FIG. 1, a matrix converter 1 according to the embodiment is disposed between a three-phase AC power supply 2 (hereinafter referred to simply as the AC power supply 2) and a load 3. The load 3 is, for example, an AC electric motor such as an induction motor and a permanent magnet synchronous motor. In the following description, an R-phase, an S-phase, and a T-phase of the AC power supply 2 are described as input phases while a U-phase, a V-phase, and a W-phase of the load 3 are described as output phases.

The matrix converter 1 includes input terminals $T_R$, $T_S$, and $T_T$, output terminal $T_U$, $T_V$, and $T_W$, a power converter 10, an LC filter 11, an input voltage detector 12, an output electric current detector 13, and a controller 14. The input terminals $T_R$, $T_S$, and $T_T$ are coupled to respective R-phase, S-phase and T-phase of the AC power supply 2. The output terminal $T_U$, $T_V$, and $T_W$ are coupled to respective U-phase, V-phase and W-phase of the load 3.

The power converter 10 includes a plurality of bidirectional switches. The power converter 10 performs direct switching of respective phase voltages of the AC power supply 2 with these bidirectional switches so as to output a three-phase AC power with any voltage and frequency to the load 3. The LC filter 11 is disposed between: the R-phase, the S-phase, and the T-phase of the AC power supply 2; and the power converter 10. The LC filter 11 reduces occurrence of a high-frequency electric current flowing into the AC power supply 2 from the power converter 10.

Figure 2:
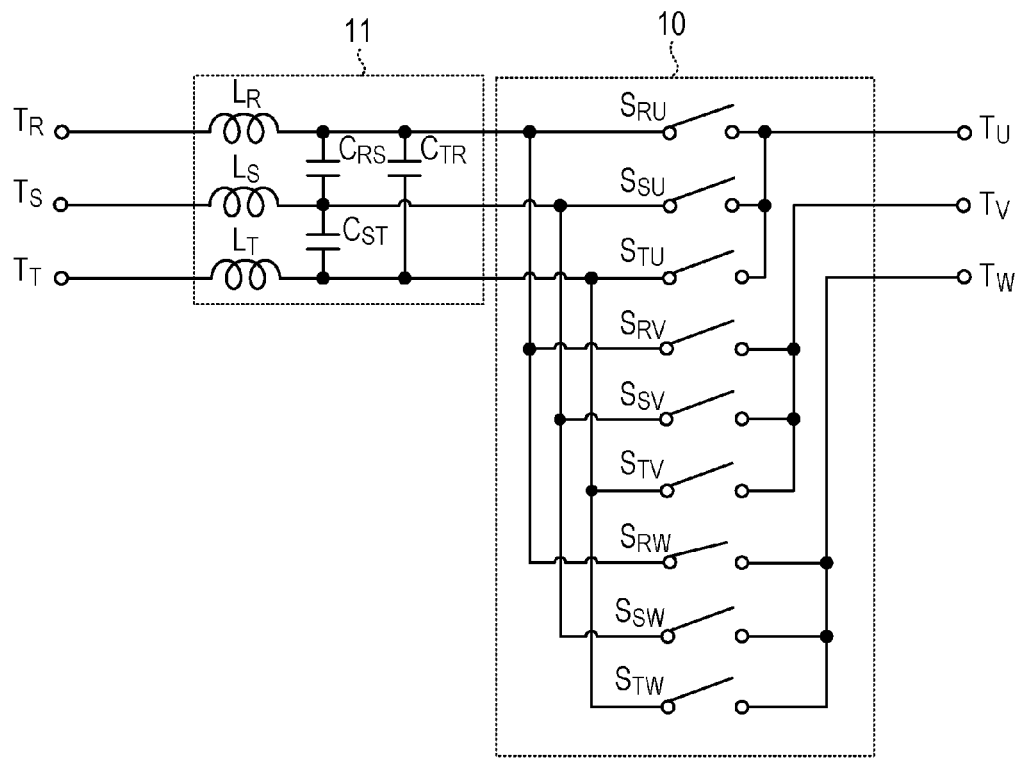
FIG. 2 is a diagram illustrating configurations of a power converter and an LC filter illustrated in FIG. 1.

FIG. 2 is a diagram illustrating configurations of the power converter 10 and the LC filter 11. As illustrated in FIG. 2, the power converter 10 includes a plurality of bidirectional switches $S_{RU}$, $S_{SU}$, $S_{TU}$, $S_{RV}$, $S_{SV}$, $S_{TV}$, $S_{RW}$, $S_{SW}$, and $S_{TW}$ (hereinafter referred to collectively as a bidirectional switch S in some cases) that couple the phases of the AC power supply 2 to the respective phases of the load 3.

The bidirectional switches $S_{RU}$, $S_{SU}$, and $S_{TU}$ couple the respective R-phase, S-phase, and T-phase of the AC power supply 2 to the U-phase of the load 3. The bidirectional switches $S_{RV}$, $S_{SV}$, and $S_{TV}$ couple the respective R-phase, S-phase, and T-phase of the AC power supply 2 to the V-phase of the load 3. The bidirectional switches $S_{RW}$, $S_{SW}$, and $S_{TW}$ couple the respective R-phase, S-phase and T-phase of the AC power supply 2 to the W-phase of the load 3.

Figure 3:
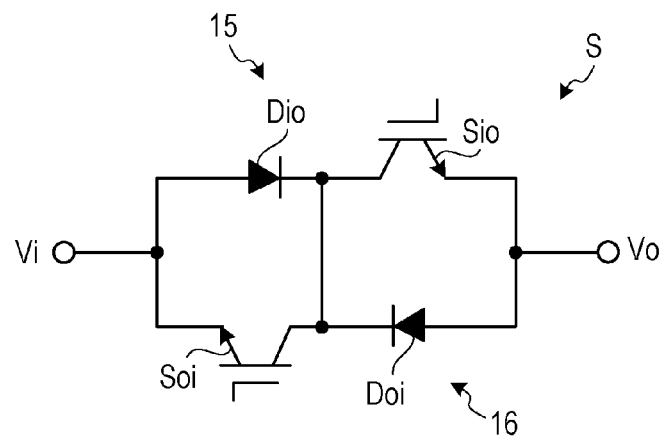
FIG. 3 is a diagram illustrating an exemplary configuration of a bidirectional switch illustrated in FIG. 1.

FIG. 3 is a diagram illustrating an exemplary configuration of the bidirectional switch S. As illustrated in FIG. 3, the bidirectional switch S includes a series circuit 15 formed by a switching element Sio and a diode Dio and a series circuit 16 formed by a switching element Soi and a diode Doi. These series circuit 15 and series circuit 16 are coupled in inverse-parallel to each other.

The switching elements Sio and Soi are semiconductor switching elements such as a metal-oxide-semiconductor field-effect transistor (MOSFET) and an insulated gate bipolar transistor (IGBT). The switching elements Sio and Soi may employ SiC or GaN that is a next-generation semiconductor switching element.

Here, the bidirectional switch S is not limited to the configuration illustrated in FIG. 3. For example, the bidirectional switch S may be constituted such that the cathode of the diode Dio and the cathode of the diode Doi are not coupled to each other. Additionally, for example, in the case where the switching elements Sio and Soi are reverse-blocking IGBTs, the bidirectional switch S may have a configuration where the switching element Sio and the switching element Soi are coupled in inverse-parallel to each other instead of the diode Dio and the diode Doi.

As illustrated in FIG. 2, the LC filter 11 includes three reactors $L_R$, $L_S$, and $L_T$ and three capacitors $C_{RS}$, $C_{ST}$, and $C_{TR}$. This LC filter 11 removes a high-frequency component caused by switching of the bidirectional switch S that constitutes the power converter 10.

Returning to FIG. 1, the description of the matrix converter 1 will be continued. The input voltage detector 12 detects respective instantaneous voltage values $E_R$, $E_S$, and $E_T$ (hereinafter referred to as input phase voltages $E_R$, $E_S$, and $E_T$) of the R-phase, the S-phase and the T-phase of the AC power supply 2. Here, in the following description, the voltages of the respective phases of the AC power supply 2 are referred to collectively as an input voltage Vi in some cases.

The output electric current detector 13 detects instantaneous values $I_U$, $I_V$, and $I_W$ (hereinafter referred to as output-phase electric currents $I_U$, $I_V$, and $I_W$) of electric currents flowing between: the power converter 10; and the respective U-phase, V-phase, and W-phase of the load 3. Here, in the following description, voltages $V_U$, $V_V$, and $V_W$ to be output to the respective phases of the load 3 from the power converter 10 are referred to collectively as an output voltage Vo in some cases.

The controller 14 selectively executes a pulse width modulation (PWM) control mode (an exemplary first control mode) and a directly combined control mode (an exemplary second control mode).

For the PWM control mode, the controller 14 performs power conversion between the AC power supply 2 and the load 3 by performing a PWM control of the bidirectional switch S. Specifically, the controller 14 generates drive signals S1 to S9 based on the input phase voltages $E_R$, $E_S$, and $E_T$ detected by the input voltage detector 12 and the output-phase electric currents $I_U$, $I_V$ and $I_W$ detected by the output electric current detector 13.

The drive signals S1 to S9 drives respective nine bidirectional switch $S_{RU}$, $S_{SU}$, $S_{TU}$, $S_{RV}$, $S_{SV}$, $S_{TV}$, $S_{RW}$, $S_{SW}$, and $S_{TW}$. Each of the drive signals S1 to S9 individually drive switching elements Sio and Soi of the corresponding bidirectional switch S. Here, the PWM control in the matrix converter 1 is a publicly known technique. For example, the PWM control can employ a technique disclosed in JP-A-11-18489 or JP-A-2012-239265.

Figure 4:
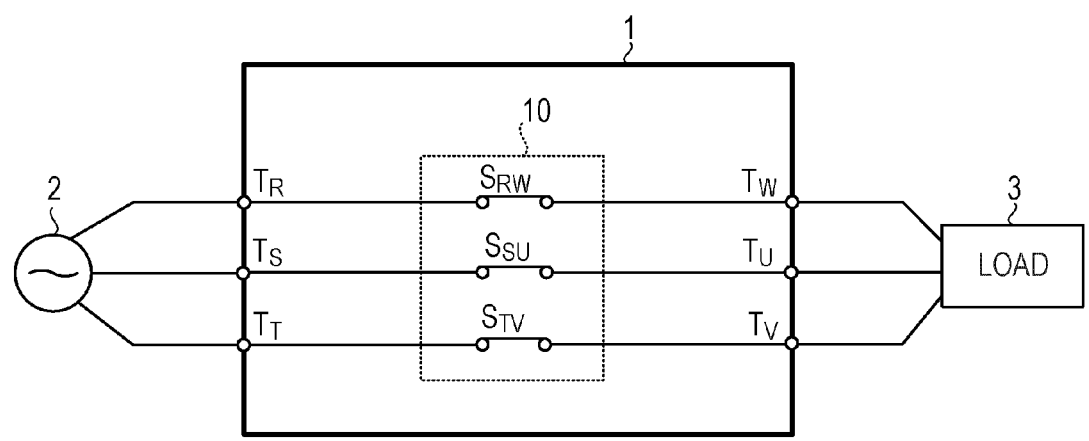
FIG. 4 is a diagram illustrating a relationship between an AC power supply, a load, and bidirectional switches in a directly combined control mode.

On the other hand, for the directly combined control mode, the controller 14 controls the bidirectional switch S so as to directly combine the AC power supply 2 and the load 3. FIG. 4 is a diagram illustrating an exemplary relationship between the AC power supply 2, the load 3, and the bidirectional switch S in the directly combined control mode. As illustrated in FIG. 4, for the directly combined control mode, the controller 14 directly combines the R-phase, the S-phase, and the T-phase of the AC power supply 2 with the respective W-phase, U-phase, and V-phase of the load 3 by, for example, continuously turning on the bidirectional switches $S_{RW}$, $S_{SU}$, and $S_{TV}$.

Figure 5:
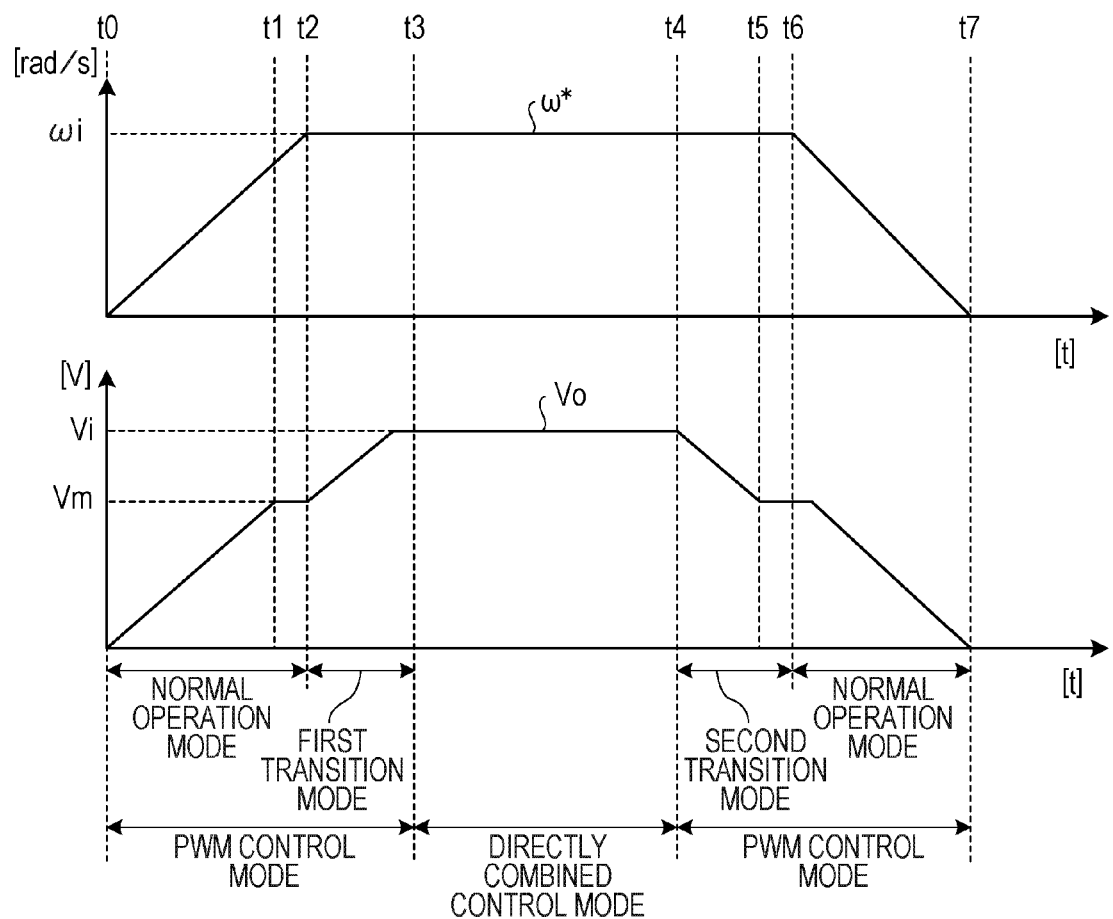
FIG. 5 is an explanatory view of switching between a PWM control mode and the directly combined control mode.

Here, a description will be given of switching between the PWM control mode and the directly combined control mode. FIG. 5 is an explanatory view of switching between the PWM control mode and the directly combined control mode. The example illustrated in FIG. 5 illustrates switching of the control mode in the case where an output frequency command ω* gradually increases from zero to a frequency ωi (hereinafter referred to as the input frequency ωi) of the input voltage Vi and then the output frequency command ω* gradually decreases from the input frequency ωi to zero. For example, the controller 14 generates the output frequency command ω* based on a set frequency $ω_{TG}$ (an exemplary target value of the frequency of the output voltage Vo) input from a higher-level device (not illustrated). Here, assume that $ω_{TG}$=ωi in the description. These frequencies are assumed to have positive or negative values. A positive frequency denotes a forward order of the corresponding input voltage or output voltage. For the forward order of the input voltage, the phase is shifted in the order from the R-phase to the S-phase to the T-phase. For the forward order of the output voltage, the phase is shifted in the order from the U-phase to the V-phase to the W-phase. A negative frequency denotes a reverse order of the corresponding input voltage or output voltage. For the reverse order of the input voltage, the phase is shifted in the order from the R-phase to the T-phase to the S-phase. For the reverse order of the output voltage, the phase is shifted in the order from the U-phase to the W-phase to the V-phase.

The controller 14 performs a PWM control of the bidirectional switch S by generating an output voltage command such that the output frequency command ω* and a frequency ωo (hereinafter referred to as the output frequency ωo) of the output voltage Vo coincide with each other. The amplitude of the output voltage command increases as the output frequency command ω* becomes closer to the input frequency ωi. Accordingly, the amplitude of the output voltage Vo increases. In a normal operation mode, to reduce the distortion in the output voltage Vo, the amplitude of the output voltage Vo is limited to be a limit voltage Vm or less (at a timing t1). The limit voltage Vm is, for example, 0.866 times as large as the amplitude of the input voltage Vi.

Afterward, when the output frequency command ω* becomes closer to the input frequency ωi and the difference between the output frequency ωo and the input frequency ωi becomes within a predetermined range (at a timing t2), the controller 14 determines that the output frequency ωo coincides with the input frequency ωi (that is, determines the coincidence of the frequencies). Based on this determination result, the controller 14 performs a transition from the normal operation mode to a first transition mode. In this first transition mode, the controller 14 performs power conversion between the AC power supply 2 and the load 3 by performing a PWM control of the bidirectional switch S similarly to the normal operation mode. Here, the input frequency ωi is, for example, a commercial frequency of 50 Hz or 60 Hz. The predetermined range is, for example, 1 Hz or 2 Hz.

When the control mode transitions to the first transition mode, the controller 14 gradually removes the limitation on the amplitude of the output voltage Vo up to the amplitude of the input voltage Vi. The controller 14 executes a voltage increase control that gradually increases the output voltage Vo up to the magnitude of the input voltage Vi. This allows reducing the rapid change of the output voltage Vo. In the case where the amplitude difference between the output voltage Vo and the input voltage Vi becomes within a predetermined range by the voltage increase control, the controller 14 determines that the amplitude of the output voltage Vo and the amplitude of the input voltage Vi coincide with each other and terminates the voltage increase control.

Additionally, the controller 14 executes a phase follow-up control in the first transition mode. This phase follow-up control causes a phase θo (hereinafter referred to as the output phase θo) of the output voltage Vo to follow up a phase θi (hereinafter referred to as the input phase θi) of the input voltage Vi. In the case where the difference between the output phase θo and the input phase θi becomes within a predetermined range by this phase follow-up control, the controller 14 determines that the output phase θo and the input phase θi coincide with each other and terminates the phase follow-up control.

The controller 14 determines the start timings and the termination timings of the voltage increase control and the phase follow-up control based on set parameters. For example, the set parameters are set by a user of the matrix converter 1 through an input unit (not illustrated). For example, the controller 14 can terminate the phase follow-up control after termination of the voltage increase control based on the set parameters. Accordingly, a higher priority can be given to the voltage increase than the phase following.

After the controller 14 determines that the output voltage Vo and the input voltage Vi coincide with each other and the output phase θo and the input phase θi coincide with each other, in the case where the output phase θo is within a range from nπ/6 (n is one or more integers from 1 to 12)−$θ_{ZE\_Band}$ to nπ/6+$θ_{ZE\_Band}$, the controller 14 makes the transition of the mode (that is, the control mode) for driving the bidirectional switch S from the first transition mode to the directly combined control mode (at a timing t3). Here, $θ_{ZE\_Band}$ is a phase coincidence detection range for reducing the influence on the detection error of the output phase θo. Additionally, the output phase θo is set to zero when the U-phase voltage becomes the positive maximum value.

As described above, the controller 14 makes the transition from the first transition mode to the directly combined control mode. This allows reducing occurrence of a shock in an output electric current Io compared with the case where the transition from the PWM control mode to the directly combined control mode is made immediately when the coincidence of the frequencies is determined.

In the case where the output phase θo is within the range from nπ/6−$θ_{ZE\_Band}$ to nπ/6+$θ_{ZE\_Band}$, the controller 14 makes the transition from the first transition mode to the directly combined control mode. This allows optimizing the output phase θo during mode switching and reducing the variation of the output electric current Io. Here, in the case where the input phase θi is within the range from nπ/6−$θ_{ZE\_Band}$ to nπ/6+$θ_{ZE\_Band}$, the controller 14 can also make the transition from the first transition mode to the directly combined control mode.

In the case where the coincidence of the frequencies is determined, the controller 14 performs the phase following. Accordingly, the controller 14 can reduce the change in acceleration by the phase following, thus reducing the variation of the output electric current Io in the first transition mode.

In the case where the non-coincidence of the frequencies is determined in the state where the bidirectional switch S is controlled in the directly combined control mode, when the output phase θo becomes within a range from nπ/6 (n is one or more integers from 1 to 12)−$θ_{ZE\_Band}$ to nπ/6+$θ_{ZE\_Band}$, the controller 14 makes the transition from the directly combined control mode to the second transition mode (at a timing t4). The controller 14 determines the non-coincidence of the frequencies, for example, in the case where the difference between the set frequency $\omega_{TG}$ and the input frequency ωi becomes out of a predetermined range. Here, in the case where the non-coincidence of the frequencies is determined, the controller 14 can also make the transition from the directly combined control mode to the second transition mode regardless of the input phase θi.

When the transition of the control mode to the second transition mode is made, the controller 14 executes a voltage decrease control that gradually decreases the output voltage Vo to the limit voltage Vm. Here, in the second transition mode, similarly to the normal operation mode, the controller 14 performs power conversion between the AC power supply 2 and the load 3 by performing the PWM control on the bidirectional switch S.

In the case where the voltage decrease control terminates (at a timing t5), the controller 14 starts a phase follow-up stop control that gradually releases the follow-up of the output phase θo with respect to the input phase θi. Subsequently, in the case where the phase follow-up stop control terminates, the controller 14 makes the transition of the mode for driving the bidirectional switch S from the second transition mode to the normal operation mode (at a timing t6). This allows reducing the variation of the output electric current Io during switching from the second transition mode to the normal operation mode. Here, the controller 14 can also perform the voltage decrease control and the phase follow-up stop control at the same time or temporally overlapped with each other.

Subsequently, the controller 14 reduces the output frequency command ω* such that the output frequency command ω* approaches the set frequency am so as to reduce the output frequency ωo. In the case where the set frequency $\omega_{TG}$ is zero and a stop is commanded, when the output frequency command ω* becomes a predetermined frequency (at a timing t7), the controller 14 stops the normal operation mode.

Thus, in the case where the non-coincidence of the frequencies is determined, the matrix converter 1 executes the voltage decrease control and the phase follow-up stop control so as to make the transition from the directly combined control mode to the normal operation mode. This allows reducing occurrence of a shock in the output electric current Io. Additionally, the matrix converter 1 makes the transition from the directly combined control mode to the second mode in the case where the output phase θo is within the range from nπ/6−$\theta_{ZE\_Band}$ to nπ/6+$\theta_{ZE\_Band}$. This allows reducing the variation of the output electric current Io during the transition from the directly combined control mode to the second mode.

In the example illustrated in FIG. 5, in the case where the transition is made from the second transition mode to the normal operation mode, the controller 14 performs the control such that the output frequency command ω* approaches the set frequency $\omega_{TG}$. However, this should not be construed in a limiting sense. The controller 14 can also perform another control based on the set parameters. For example, at the timing when the set frequency $\omega_{TG}$ changes, the controller 14 can also reduce the output frequency command ω* such that the output frequency command ω* approaches the set frequency $\omega_{TG}$. In this case, in the case where the difference between the amplitude of the output voltage Vo and the amplitude of the input voltage Vi becomes out of a predetermined range, the controller 14 determines that the voltages do not coincide with each other and then makes the transition from the directly combined control mode to the second transition mode. When the transition of the control mode to the second transition mode is made, the controller 14 executes the voltage decrease control and the phase follow-up stop control. In the case where the voltage decrease control and the phase follow-up stop control terminate, the controller 14 makes the transition of the mode for driving the bidirectional switch S from the second transition mode to the normal operation mode.

(2. Configuration of Controller 14)

Figure 6:
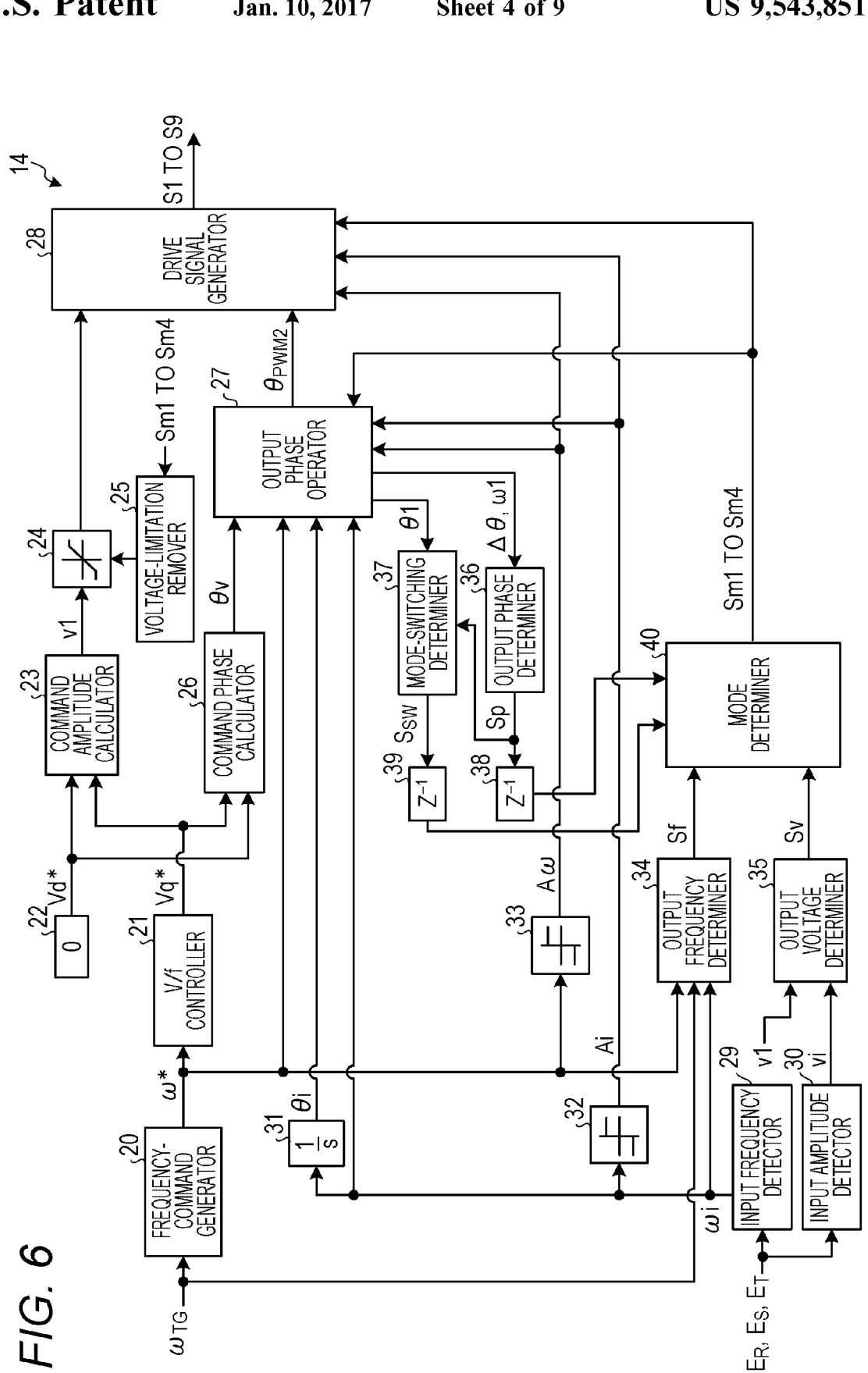
FIG. 6 is a diagram illustrating an exemplary configuration of a controller illustrated in FIG. 1.

FIG. 6 is a diagram illustrating an exemplary configuration of the controller 14. As illustrated in FIG. 6, the controller 14 includes a frequency-command generator 20 (an exemplary frequency-command generation device), a V/f controller 21 (an exemplary voltage-command generator), a d-axis voltage-command generator 22, a command amplitude calculator 23, a limiter 24, a voltage-limitation remover 25 (an exemplary voltage-limitation removal device), a command phase calculator 26, an output phase operator 27 (an exemplary phase operator), and a drive signal generator 28 (an exemplary switch driver).

The controller 14 further includes an input frequency detector 29, an input amplitude detector 30, an integrator 31 (an exemplary phase detector), sign-function calculators 32 and 33, an output frequency determiner 34 (an exemplary frequency determiner), an output voltage determiner 35 (an exemplary voltage determiner), an output phase determiner 36 (an exemplary phase determiner), a mode-switching determiner 37 (an exemplary mode-switching determination device), delayers 38 and 39, and a mode determiner 40.

This controller 14 includes, for example, a microcomputer that includes a central processing unit (CPU), a read only memory (ROM), a random access memory (RAM), input/output ports, and similar member and various circuits. The CPU of this microcomputer functions as the respective parts 21 to 40 by reading out the program stored in the ROM and executing this program so as to. Here, the respective parts 21 to 40 may be configured by hardware without using the program.

The frequency-command generator 20 generates the output frequency command ω* corresponding to the set frequency $\omega_{TG}$ and outputs the output frequency command ω* to the V/f controller 21. For example, in the case where the set frequency corm having the relationship where $\omega_{TG}$≥ωi is input, the frequency-command generator 20 generates the output frequency command ω* for causing the output frequency ωo to reach the set frequency $\omega_{TG}$ in a predetermined period. For example, when the set frequency $\omega_{TG}$ is input at a timing t0 illustrated in FIG. 5, the output frequency command ω* generated by the frequency-command generator 20 increases in proportion to the lapse of time and then coincides with the set frequency $\omega_{TG}$ at the timing t2.

Additionally, for example, when the set frequency corm lower than the input frequency ωi is input in the directly combined control mode, the frequency-command generator 20 generates the output frequency command ω* for causing the output frequency command ω* to reach the set frequency $\omega_{TG}$ in the predetermined period on the condition that the voltage decrease control and the phase follow-up stop control terminate (for example, at the timing t6 when the set frequency $\omega_{TG}$ is close to zero as illustrated in FIG. 5).

The V/f controller 21 outputs a q-axis output voltage command Vq* corresponding to the output frequency command ω* to the command amplitude calculator 23 and the command phase calculator 26. The q-axis output voltage command Vq* is a voltage command for the q-axis component in a dq coordinate system. The d-axis in the dq coordinate system is the output phase θo while the q-axis is perpendicular to the d-axis.

The d-axis voltage-command generator 22 outputs a d-axis output voltage command Vd* to the command amplitude calculator 23 and the command phase calculator 26. The d-axis output voltage command Vd* is a voltage command corresponding to the d-axis component. With this d-axis output voltage command Vd*, the d-axis component is set to, for example, zero. Here, the d-axis voltage-command generator 22 can also output the d-axis output voltage command Vd* with the value corresponding to the output frequency ωo to the command amplitude calculator 23 and the command phase calculator 26 in the normal operation mode.

The command amplitude calculator 23 computes an output-voltage-command amplitude v1 based on the d-axis output voltage command Vd* and the q-axis output voltage command Vq*. For example, the command amplitude calculator 23 computes the output-voltage-command amplitude v1 from the following formula (1). The command amplitude calculator 23 outputs the output-voltage-command amplitude v1 to the drive signal generator 28.

(Formula 1)

$$v1 = \sqrt{Vd^{*2} + Vq^{*2}} \quad (1)$$

The limiter 24 limits the output-voltage-command amplitude v1 output from the command amplitude calculator 23 to the value that does not exceed the limit voltage Vm in the normal operation mode. The limiter 24 outputs the output-voltage-command amplitude v1 equal to or less than the limit voltage Vm to the drive signal generator 28. The limit voltage Vm is set to, for example, 0.866 times as large as the amplitude of the input voltage Vi.

In the case where a mode selection signal Sm1 of High level is output from the mode determiner 40, the voltage-limitation remover 25 maintains the above-described limitation in which the output-voltage-command amplitude v1 is set to be equal to or less than the limit voltage Vm by the limiter 24. Additionally, in the case where a mode selection signal Sm2 becomes High level from Low level, the voltage-limitation remover 25 reduces the limitation on the output-voltage-command amplitude v1 by the limiter 24 in phases. Accordingly, the output-voltage-command amplitude v1 gradually becomes larger than the limit voltage Vm. The limiter 24 and the voltage-limitation remover 25 are an exemplary voltage limitation controller.

In the case where a mode selection signal Sm4 becomes High level from Low level, the voltage-limitation remover 25 causes limitation on the output-voltage-command amplitude v1 by the limiter 24 in phases. This causes the voltage decrease control in which the limiter 24 gradually limits the output-voltage-command amplitude v1 and finally limits the output-voltage-command amplitude v1 to the value equal to or less than the limit voltage Vm. When the voltage decrease control terminates, the voltage-limitation remover 25 gives notice of voltage-decrease termination information to the output phase operator 27 and the mode determiner 40.

The command phase calculator 26 obtains an output-voltage-command phase θv based on the d-axis output voltage command Vd* and the q-axis output voltage command Vq*. For example, the command phase calculator 26 obtains the output-voltage-command phase θv from the following formula (2). This output-voltage-command phase θv is output from the command phase calculator 26 to the output phase operator 27. Here, in the case where Vd=0, the command phase calculator 26 does not compute Vq*/Vd* in the formula (2) and sets θv=90°.

(Formula 2)

$$\theta v = \tan^{-1}(Vq^*/Vd^*) \quad (2)$$

The output phase operator 27 outputs a control phase $\theta_{PWM2}$ corresponding to the mode selection signals Sm1 to Sm4 output from the mode determiner 40. The output phase operator 27 selects respective phases corresponding to the normal operation mode, the first transition mode, the directly combined control mode, and the second transition mode based on the mode selection signals Sm1 to Sm4 and outputs these phases as the control phase $\theta_{PWM2}$. For example, the output phase operator 27 performs the phase follow-up control in the first transition mode and performs the phase follow-up stop control in the second transition mode. When the phase follow-up stop control terminates, the output phase operator 27 gives notice of phase-follow-up-stop termination information to the mode determiner 40. This output phase operator 27 will be described in detail below with reference to FIG. 9.

For the normal operation mode, the first transition mode, and the second transition mode, the drive signal generator 28 generates output voltage commands $V_{U^*}$, $V_{V^*}$, and $V_{W^*}$ having the amplitudes and the phases corresponding to the output-voltage-command amplitude v1 and the control phase $\theta_{PWM2}$. The drive signal generator 28 generates the drive signals S1 to S9 to be output to the power converter 10 based on the output voltage commands $V_{U^*}$, $V_{V^*}$, and $V_{W^*}$. The drive signal generator 28 outputs the generated drive signals S1 to S9 to the power converter 10.

For example, the drive signal generator 28 generates the output voltage commands $V_{U^*}$, $V_{V^*}$, and $V_{W^*}$ based on the output-voltage-command amplitude v1 and the control phase $\theta_{PWM2}$. The drive signal generator 28 generates a PWM signal with a method such as triangular wave comparison based on the output voltage commands $V_{U^*}$, $V_{V^*}$, and $V_{W^*}$. The drive signal generator 28 performs a commutation operation on the PWM signal based on the magnitude relationship between the input phase voltages $E_R$, $E_S$, and $E_T$ and/or the output-phase electric currents $I_U$, $I_V$, and $I_W$. With this operation, the drive signal generator 28 generates the drive signals S1 to S9 and outputs these signals to the power converter 10. Accordingly, the bidirectional switch S constituting the power converter 10 is controlled. As a result, the three-phase power corresponding to the output voltage commands $V_{U^*}$, $V_{V^*}$, and $V_{W^*}$ is output from the power converter 10 to the load 3.

The drive signal generator 28 generates the output voltage commands $V_{U^*}$, $V_{V^*}$, and $V_{W^*}$ using, for example, operational expressions such as $V_{U^*} = v1 \times \cos(\theta_{PWM2})$, $V_{V^*} = v1 \times \cos(\theta_{PWM2} - 2/3\pi)$ and $V_{W^*} = v1 \times \cos(\theta_{PWM2} + 2/3\pi)$.

For the directly combined control mode, the drive signal generator 28 generates the drive signals S1 to S9 for controlling the bidirectional switch S based on a polarity signal Ai indicative of the polarity of the input frequency ωi and a polarity signal Aω indicative of the polarity (an exemplary rotation direction) of the output frequency command ω*. Thus, the bidirectional switch S is controlled with a switch control pattern corresponding to the polarity of the input frequency cal and the polarity of the output frequency command ω*. Accordingly, in the case where the load 3 is an electric motor, the AC power supply 2 and the load 3 can be directly combined with each other regardless of whether the operating state of the electric motor is a forward rotation operation or a reverse rotation operation.

Figures 7, 8:
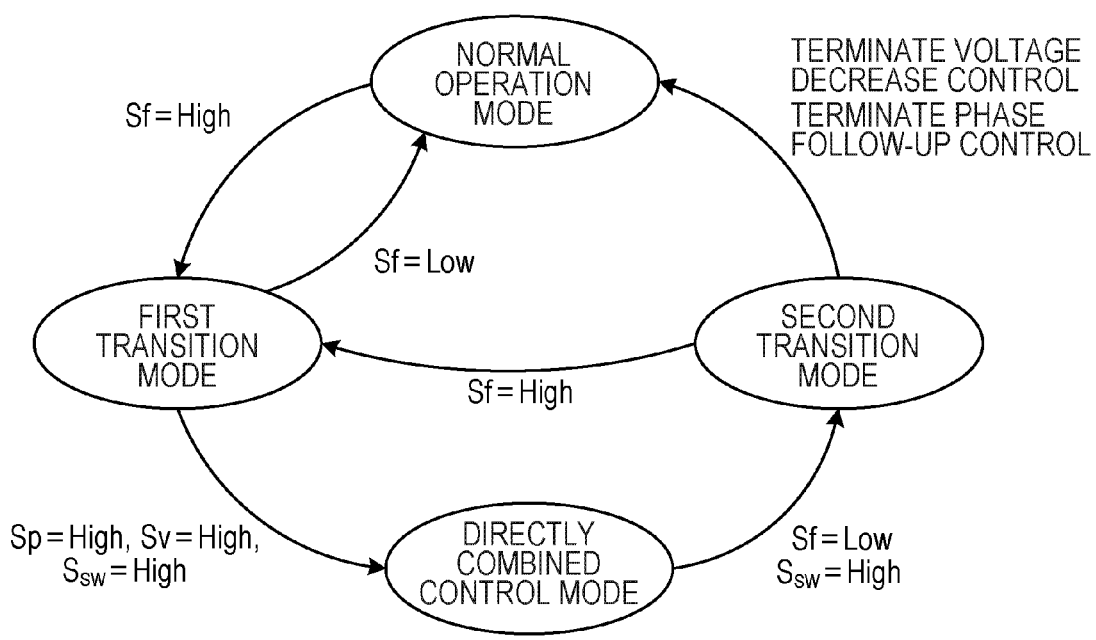
FIG. 7 is a table illustrating a relationship between the polarity of an input frequency, the polarity of an output frequency command, and a bidirectional switch S to be turned on in the directly combined control mode.
FIG. 8 is a diagram illustrating transition conditions of control modes.

FIG. 7 is a table illustrating a relationship between the polarity of the input frequency ωi, the polarity of the output frequency command ω*, and the bidirectional switch S to be turned on in the directly combined control mode. As illustrated in FIG. 7, for example, the drive signal generator 28 outputs the drive signals S1 to S9 for turning on the bidirectional switches $S_{RW}$, $S_{SU}$ and $S_{TV}$ alone in the case where the input frequency ωi and the output frequency command ω* both have positive polarities or negative polarities. In the case where any one of the input frequency ωi and the output frequency command ω* has a positive polarity and the other has a negative polarity, the drive signal generator 28 outputs the drive signals S1 to S9 for turning on the bidirectional switches $S_{RW}$, $S_{SV}$ and $S_{TU}$ alone.

Returning to FIG. 6, the description of the controller 14 will be continued. The input frequency detector 29 computes the input frequency ωi from the input phase voltages $E_R$, $E_S$, and $E_T$ detected by the input voltage detector 12. The input frequency detector 29 outputs the input frequency ωi to the output phase operator 27, the integrator 31, the sign-function calculator 32, and the output frequency determiner 34. The input frequency detector 29 is constituted of, for example, a phase locked loop (PLL).

The input amplitude detector 30 computes an amplitude vi (hereinafter referred to as the input voltage amplitude vi) of the input voltage Vi from the input phase voltages $E_R$, $E_S$, and $E_T$ detected by the input voltage detector 12.

The integrator 31 computes the input phase θi by integrating the input frequency ωi to be output from the input frequency detector 29. The integrator 31 outputs the input phase θi to the output phase operator 27. In the case where the input frequency detector 29 is constituted of the PLL, the input phase θi can be output from the PLL and the integrator 31 can be omitted.

In the case where the polarity of the input frequency ωi is a positive polarity, the sign-function calculator 32 outputs the polarity signal Ai at High level to the output phase operator 27 and the drive signal generator 28. In the case where the polarity of the input frequency ωi is a negative polarity, the sign-function calculator 32 outputs the polarity signal Ai at Low level to the output phase operator 27 and the drive signal generator 28.

In the case where the polarity of the output frequency command ω* is a positive polarity, the sign-function calculator 33 outputs the polarity signal Aω at High level to the output phase operator 27 and the drive signal generator 28. In the case where the polarity of the output frequency command ω* is a negative polarity, the sign-function calculator 33 outputs the polarity signal Aω at Low level to the output phase operator 27 and the drive signal generator 28.

In the case where the difference between the output frequency command ω* and the input frequency ωi is within a predetermined range and the difference between the input frequency ωi and the set frequency $ω_{TG}$ is within a predetermined range, the output frequency determiner 34 outputs a frequency determination signal Sf (an exemplary frequency coincidence signal) indicative of frequency coincidence at High level. This output frequency determiner 34 will be described in detail below with reference to FIG. 10 and FIG. 11.

Here, in the example illustrated in FIG. 6, the output frequency to be compared with the input frequency ωi employs the output frequency command ω* corresponding to the output frequency ωo. Instead, an output frequency detector for directly detecting the output frequency ωo may be disposed in the controller 14. In this case, the output frequency determiner 34 outputs the frequency determination signal Sf indicative of frequency coincidence in the case where the difference between the output frequency ωo and the input frequency ωi is within a predetermined range, instead of using the output frequency command ω*.

In the case where the difference between the output-voltage-command amplitude v1 and the input voltage amplitude vi is within a predetermined range, the output voltage determiner 35 outputs a voltage determination signal Sv (an exemplary voltage coincidence signal) indicative of voltage coincidence at High level. This output voltage determiner 35 will be described in detail below with reference to FIG. 12 and FIG. 13.

Here, in the example illustrated in FIG. 6, the amplitude of the output voltage Vo to be compared with the input voltage amplitude vi employs the output-voltage-command amplitude v1. Instead, an output amplitude detector for directly detecting an amplitude vo (hereinafter referred to as the output voltage amplitude vo) of the output voltage Vo may be disposed in the controller 14. In this case, the output voltage determiner 35 outputs the voltage determination signal Sv indicative of voltage coincidence in the case where the difference between the output voltage amplitude vo and the input voltage amplitude vi is equal to or less than a determination threshold Δv, instead of using the output-voltage-command amplitude v1.

The output phase determiner 36 outputs a phase determination signal Sp corresponding to the difference between the absolute value of a phase variation amount Δθ and the phase threshold $Δθ_{ZE\_cmp}$ to the delayer 38 in the first transition mode. The delayer 38 delays the phase determination signal Sp by a sampling time Ti and then outputs this signal to the mode determiner 40.

In the case where the phase determination signal Sp indicative of phase coincidence is output from the output phase determiner 36 and a virtual output phase θ1 corresponding to the output phase θo is within a range from $nπ/6−θ_{ZE\_Band}$ to $nπ/6+θ_{ZE\_Band}$, the mode-switching determiner 37 outputs a mode switching signal Ssw indicative of a switching instruction to the delayer 39. The delayer 39 delays the mode switching signal Ssw by the sampling time Ti and then outputs this signal to the mode determiner 40. Here, the virtual output phase θ1 is an exemplary virtual phase.

The mode determiner 40 determines the control mode based on the frequency determination signal Sf, the voltage determination signal Sv, the phase determination signal Sp, and the mode switching signal Ssw. The mode determiner 40 outputs the mode selection signals Sm1 to Sm4 corresponding to the determined control mode.

FIG. 8 is a diagram illustrating transition conditions of the control modes. For the normal operation mode, the mode determiner 40 sets the mode selection signal Sm1 to High level and sets the other mode selection signals Sm2 to Sm4 to Low level.

As illustrated in FIG. 8, in the case where the frequency determination signal Sf becomes High level from Low level in the normal operation mode, the mode determiner 40 makes the transition of the control mode to the first transition mode. The transition to the first transition mode is made by setting the mode selection signal Sm1 from High level to Low level and setting the mode selection signal Sm2 from Low level to High level. Accordingly, in the case where the difference between the output frequency ωo and the input frequency ωi becomes within the predetermined range, the control mode is switched from the normal operation mode to the first transition mode.

In the case where all of the voltage determination signal Sv, the phase determination signal Sp, and the mode switching signal Ssw become at High level in the first transition mode, the mode determiner 40 makes the transition of the control mode to the directly combined control mode. The transition to the directly combined control mode is made by setting the mode selection signal Sm2 from High level to Low level and setting the mode selection signal Sm3 from Low level to High level. Accordingly, the voltage increase control and the phase follow-up control terminate. In the case where the output phase θo is within the range from $n\pi/6 - \theta_{ZE\_Band}$ to $n\pi/6 + \theta_{ZE\_Band}$, the control mode is switched from the first transition mode to the directly combined control mode. Here, in the case where the voltage determination signal Sv and the phase determination signal Sp become at High level regardless of whether the state of the mode switching signal Ssw, the mode determiner 40 can also switch the control mode from the first transition mode to the directly combined control mode.

In the case where the frequency determination signal Sf becomes Low level from High level in the first transition mode, the mode determiner 40 makes the transition of the control mode to the normal operation mode. The transition to the normal operation mode is made by setting the mode selection signal Sm2 from High level to Low level and setting the mode selection signal Sm1 from Low level to High level.

In the case where the frequency determination signal Sf becomes Low level from High level and the mode switching signal Ssw becomes High level in the directly combined control mode, the mode determiner 40 makes the transition of the control mode to the second transition mode. The transition to the second transition mode is made by setting the mode selection signal Sm3 from High level to Low level and setting the mode selection signal Sm4 from Low level to High level. Accordingly, in the case where the difference between the set frequency $\omega_{TG}$ and the input frequency $\omega i$ becomes out of the predetermined range and the input phase θi becomes $n\pi/6 \pm \theta_{ZE\_Band}$, switching from the directly combined control mode to the second transition mode is performed.

In the case where the voltage-limitation remover 25 gives notice of the voltage-decrease termination information and the output phase operator 27 gives notice of the phase-follow-up-stop termination information in the second transition mode, the mode determiner 40 makes the transition of the control mode to the normal operation mode. The transition to the normal operation mode is made by setting the mode selection signal Sm4 from High level to Low level and setting the mode selection signal Sm1 from Low level to High level. Accordingly, in the case where the voltage decrease control and the phase follow-up stop control terminate, the control mode is switched from the second transition mode to the normal operation mode.

(3. Configuration of Output Phase Operator 27)

Figure 9:
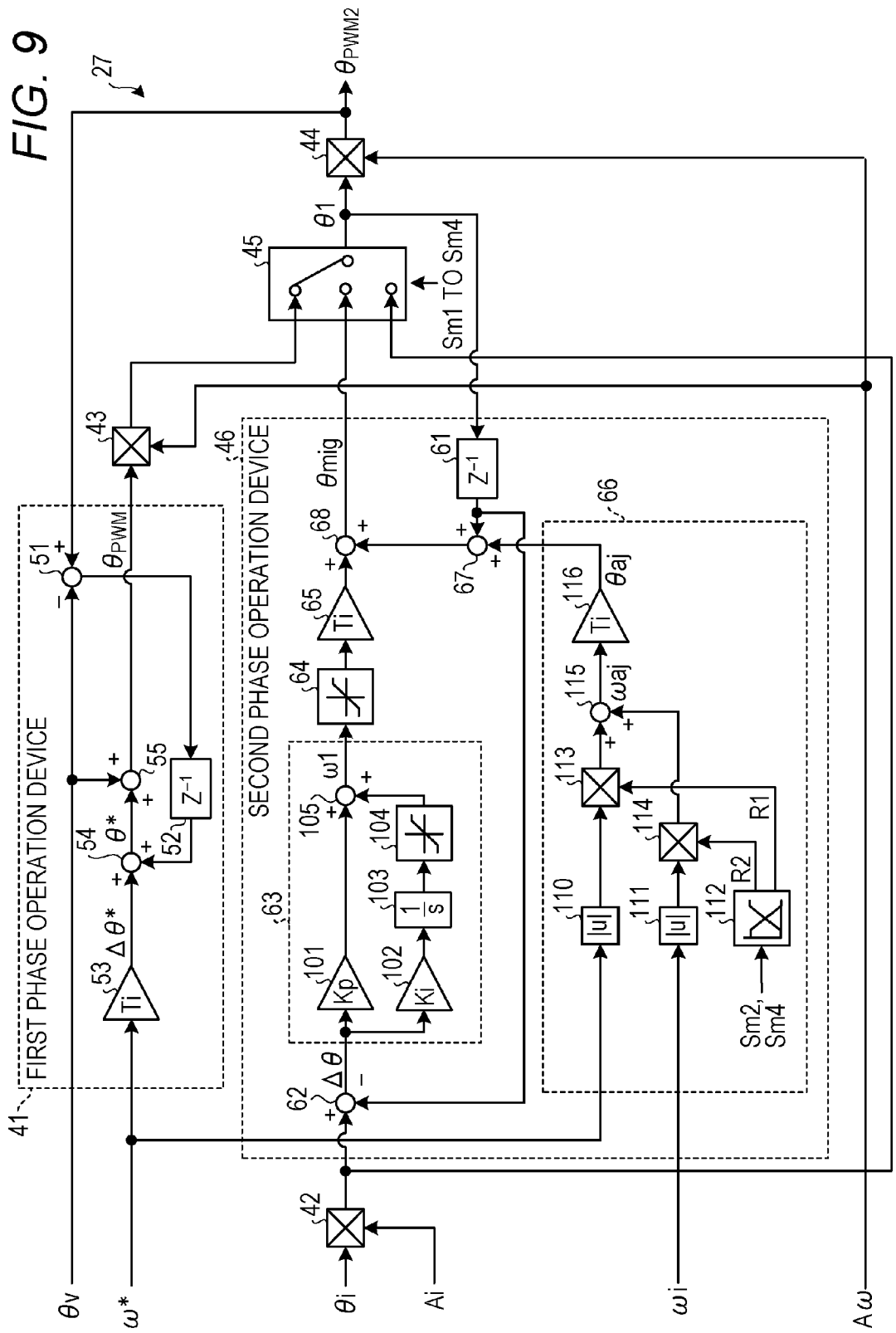
FIG. 9 is a diagram illustrating an exemplary configuration of an output phase operator illustrated in FIG. 6.

The output phase operator 27 outputs the control phase $\theta_{PWM2}$ corresponding to the mode selection signals Sm1 to Sm4 output from the mode determiner 40. FIG. 9 is a diagram illustrating an exemplary configuration of the output phase operator 27. As illustrated in FIG. 9, the output phase operator 27 includes a first phase operation device 41, multipliers 42 to 44, a switcher 45, and a second phase operation device 46. The following specifically describes the first phase operation device 41, the multipliers 42 to 44, the switcher 45, and the second phase operation device 46.

(3.1. First Phase Operation Device 41)

The first phase operation device 41 is a phase operation device for the normal operation mode. This first phase operation device 41 includes a subtractor 51, a delayer 52, an amplifier 53, and adders 54 and 55.

The subtractor 51 subtracts the output-voltage-command phase θv from the control phase $\theta_{PWM2}$. The subtractor 51 outputs the subtraction result to the delayer 52. The delayer 52 delays the subtraction result of the subtractor 51 by the sampling time Ti and outputs this result to the adder 54. The amplifier 53 obtains a phase variation amount Δθ* by multiplying the output frequency command ω* by the sampling time Ti. The amplifier 53 outputs the phase variation amount Δθ* to the adder 54.

The adder 54 obtains a command phase θ* by adding the output of the delayer 52 to the phase variation amount Δθ*. The adder 54 outputs the command phase θ* to the adder 55. The adder 55 generates a voltage phase $\theta_{mivi}$ (referred to as the normal-operation phase $\theta_{PWM}$) for the normal operation mode by adding the command phase θ* and the output-voltage-command phase θv.

Thus, the first phase operation device 41 generates the normal-operation phase $\theta_{PWM}$ based on the output frequency command ω* and the output-voltage-command phase θv. The first phase operation device 41 outputs the normal-operation phase $\theta_{PWM}$ to the multiplier 43.

(3.2. Multipliers 42 to 44)

The multipliers 42 to 44 adjust the polarities of the output frequency command ω* and the input frequency ωi. Accordingly, regardless of the phase order* of the output voltage Vo and the phase order of the input voltage Vi, it is possible to perform computations based on the output frequency command ω* or the input phase θi in the first phase operation device 41 and the second phase operation device 46.

The multiplier 42 (an exemplary phase replacer) multiplies the polarity signal Ai indicative of the polarity of the input frequency ωi by the input phase θi and outputs the multiplication result to the second phase operation device 46. Accordingly, even when the input phase θi has a negative polarity, the input phase θi with a positive polarity is input to the second phase operation device 46.

The multiplier 43 multiplies the polarity signal Aω indicative of the polarity of the output frequency command ω* by the normal-operation phase $\theta_{PWM}$ and outputs the multiplication result to the switcher 45. Accordingly, even when the normal-operation phase $\theta_{PWM}$ has a negative polarity, the normal-operation phase $\theta_{PWM}$ with a positive polarity is input to the switcher 45.

The multiplier 44 (an exemplary phase inverse replacer) multiplies the polarity signal Aω indicative of the polarity of the output frequency command ω* by the virtual output phase θ1 and outputs the multiplication result to the drive signal generator 28 (see FIG. 6). Accordingly, the virtual output phase θ1 with an accurately set polarity is input to the drive signal generator 28.

(3.3. Switcher 45)

The switcher 45 switches the output corresponding to the mode selection signals Sm1 to Sm4 output from the mode determiner 40.

Specifically, in the case where the mode selection signal Sm1 is at High level, the switcher 45 outputs the normal-operation phase $\theta_{PWM}$ output from the first phase operation device 41 through the multiplier 43 as the virtual output phase θ1 to the multiplier 44 and the second phase operation device 46. Accordingly, for the normal operation mode, the normal-operation phase $\theta_{PWM}$ is output as the control phase $\theta_{PWM2}$ from the output phase operator 27 to the drive signal generator 28 (see FIG. 6).

In the case where the mode selection signal Sm2 or the mode selection signal Sm4 is at High level, the switcher 45 outputs a phase-transition phase θmig output from the second phase operation device 46 as the virtual output phase θ1 to the multiplier 44 and the second phase operation device 46. Accordingly, for the first transition mode and the second transition mode, the phase-transition phase θmig is output as the control phase $θ_{PWM2}$ from the output phase operator 27 to the drive signal generator 28 (see FIG. 6).

In the case where the mode selection signal Sm3 is at High level, the switcher 45 outputs the input phase θi that is output from the multiplier 42 and has a positive polarity as the virtual output phase θ1 to the multiplier 44 and the second phase operation device 46. Accordingly, for the directly combined control mode, the input phase θi is output as the control phase $θ_{PWM2}$ from the output phase operator 27 to the drive signal generator 28 (see FIG. 6).

(3.4. Second Phase Operation Device 46)

The second phase operation device 46 is a phase operation device for the first transition mode and the second transition mode. This second phase operation device 46 includes a delayer 61, a subtractor 62, a proportional-integral (PI) controller 63, a limiter 64, an amplifier 65, a follow-up phase operator 66 (an exemplary compensation-value operator), and adders 67 and 68. The delayer 61, the subtractor 62, the PI controller 63, the limiter 64, and the amplifier 65 are an exemplary virtual phase operator.

The delayer 61 delays the virtual output phase θ1 by the sampling time Ti. The delayer 61 outputs the delayed virtual output phase θ1 to the subtractor 62 and the adder 67. The subtractor 62 obtains a phase variation amount Δθ by subtracting the virtual output phase θ1 delayed by the delayer 61 from the input phase Di with a positive polarity output from the multiplier 42. The subtractor 62 outputs the phase variation amount Δθ to the PI controller 63.

The PI controller 63 generates a virtual output frequency ω1 for setting the phase variation amount Δθ to zero and outputs this virtual output frequency ω1 to the limiter 64. The virtual output frequency ω1 is a compensation value for a forward control of the output phase performed by the follow-up phase operator 66. The virtual output frequency ω1 corresponds to the variation component of the output frequency ωo in a transient state until the input phase and the output phase coincide with each other. The PI controller 63 includes a multiplier 101 with a proportional gain Kp, a multiplier 102 with an integral gain Ki, an integrator 103, a limiter 104, and an adder 105. The limiter 104 limits the integral value.

The PI controller 63 generates the virtual output frequency ω1 based on the difference between the input phase Di and the virtual output phase θ1. Accordingly, in the case where there is a difference in polarity between the input phase θi and the virtual output phase θ1, the PI controller 63 has difficulty in causing the difference between the input phase θi and the virtual output phase θ1 to converge. Therefore, the multiplier 42 sets the input phase θi to have a positive polarity. The multipliers 42 and 43 set the virtual output phase θ1 to have a positive polarity.

In the case where a trouble occurs, for example, the variation range of the virtual output frequency ω1 becomes larger by the PI controller 63 and the output electric current to the load 3 significantly changes, as illustrated in FIG. 9, the limiter 64 may be disposed at the output of the PI controller 63. The limiter 64 limits the virtual output frequency ω1 to be equal to or less than a predetermined range and outputs the virtual output frequency ω1 after the limitation to the amplifier 65. Furthermore, in the case where the output of the integrator 103 of the PI controller 63 excessively increases only by disposing the limiter 64, as illustrated in FIG. 9, the limiter 104 may be disposed.

The amplifier 65 multiplies the virtual output frequency ω1 by the sampling time Ti and outputs the multiplication result. The virtual output frequency ω1 is a compensation value for a forward control of the output phase performed by the follow-up phase operator 66. The virtual output frequency ω1 corresponds to the variation component of the output frequency ωo in a transient state until the input phase and the output phase coincide with each other. Compensation on the forward control of the output phase is performed for enhancing the response to the phase following and limiting the variation of the output frequency ωo. Here, the compensation on the forward control of the output phase is not necessarily required. Instead of this compensation, the response to the phase following may be enhanced by, for example, increasing the gain of the PI controller 63. Here, increasing the gain of the PI controller 63 increases the variation of the output frequency. Accordingly, the sampling time is preferred to be short.

The follow-up phase operator 66 generates and outputs a phase adjustment amount θaj corresponding to the difference between the output frequency command ω* and the input frequency ωi. For the first transition mode, the follow-up phase operator 66 generates the phase adjustment amount θaj (an exemplary phase compensation value) such that the output frequency ωo follows up the input frequency ωi. For the second transition mode, the follow-up phase operator 66 generates the phase adjustment amount θaj such that the output frequency ωo follows up the output frequency command ω*.

Specifically, when the mode selection signal Sm2 becomes at High level, the follow-up phase operator 66 adds the input frequency ωi and the output frequency command ω* while changing the ratio of the input frequency ωi and the ratio of the output frequency command ω* such that the ratio of the input frequency ωi increases as time passes. When the mode selection signal Sm4 becomes at High level and the voltage-limitation remover 25 gives notice of the voltage-decrease termination information, the follow-up phase operator 66 adds the input frequency ωi and the output frequency command ω* while changing the ratio of the input frequency ωi and the ratio of the output frequency command ω* such that the ratio of the output frequency command ω* increases as time passes.

The follow-up phase operator 66 includes absolute-value operators 110 and 111, a subtraction-ratio setter 112, multipliers 113 and 114, an adder 115, and a multiplier 116.

The absolute-value operator 110 computes the absolute value of the output frequency command ω*. Accordingly, in the case where the polarity of the output frequency command ω* is a negative polarity, the polarity of the output frequency command ω* becomes a positive polarity. The absolute-value operator 110 outputs the output frequency command ω* with the positive polarity to the multiplier 113.

The absolute-value operator 111 computes the absolute value of the input frequency ωi. Accordingly, in the case where the polarity of the input frequency ωi is a negative polarity, the polarity of the input frequency ωi becomes a positive polarity. The absolute-value operator 111 outputs the input frequency ωi with the positive polarity to the multiplier 114.

When the mode selection signal Sm2 becomes at High level, the subtraction-ratio setter 112 generates an output frequency ratio R1 that changes from 1 to 0 as time passes and an input frequency ratio R2 that changes from 0 to 1 as time passes. When the mode selection signal Sm4 becomes at High level, the subtraction-ratio setter 112 generates the output frequency ratio R1 that changes from 0 to 1 as time passes and the input frequency ratio R2 that changes from 1 to 0 as time passes.

The subtraction-ratio setter 112 outputs the output frequency ratio R1 to the multiplier 113 and outputs the input frequency ratio R2 to the multiplier 114. The output frequency ratio R1 and the input frequency ratio R2 change linearly, for example, with gradient coefficients set to the time passage. Here, the gradient coefficient is a set parameter, for example, set by the user of the matrix converter 1 through an input unit (not illustrated).

The multiplier 113 multiplies the output frequency command $\omega^*$ with the positive polarity by the output frequency ratio R1 and outputs the multiplication result to the adder 115. The multiplier 114 multiplies the input frequency $\omega i$ with the positive polarity by the input frequency ratio R2 and outputs the multiplication result to the adder 115.

The adder 115 adds the computation result of the multiplier 114 and the computation result of the multiplier 113 so as to generate a frequency adjustment amount $\omega aj$ (=$|\omega i| \times R2 + |\omega^*| \times R1$). The adder 115 outputs the frequency adjustment amount $\omega aj$ to the multiplier 116. The multiplier 116 generates the phase adjustment amount $\theta aj$ by multiplying the frequency adjustment amount $\omega aj$ by the sampling time Ti. The multiplier 116 outputs this phase adjustment amount $\theta aj$ to the adder 67.

Thus, the follow-up phase operator 66 obtains the frequency adjustment amount $\omega aj$ while changing the ratio related to the output frequency command $\omega^*$ and the ratio related to the input frequency $\omega i$. Furthermore, the follow-up phase operator 66 generates the phase adjustment amount $\theta aj$ based on this frequency adjustment amount $\omega aj$. Accordingly, the follow-up phase operator 66 can generate the phase adjustment amount $\theta aj$ for causing the output frequency $\omega o$ to gradually following up the input frequency $\omega i$ and the phase adjustment amount $\theta aj$ for causing the output frequency $\omega o$ to gradually following up the output frequency command $\omega^*$. Here, in the case where the input frequency ratio R2 decreases and becomes equal to or less than a predetermined value (for example, approximately zero), the follow-up phase operator 66 gives notice of the phase-follow-up-stop termination information to the mode determiner 40.

The adder 67 adds the phase adjustment amount $\theta aj$ output from the follow-up phase operator 66 and the virtual output phase $\theta 1$ output from the delayer 61, and outputs the addition result to the adder 68. The adder 68 (an exemplary phase compensator) generates and outputs the phase-transition phase $\theta mig$ to the switcher 45 by adding the computation result of the amplifier 65 and the computation result of the adder 67.

(4. Configuration of Output Frequency Determiner 34)

Figure 10:
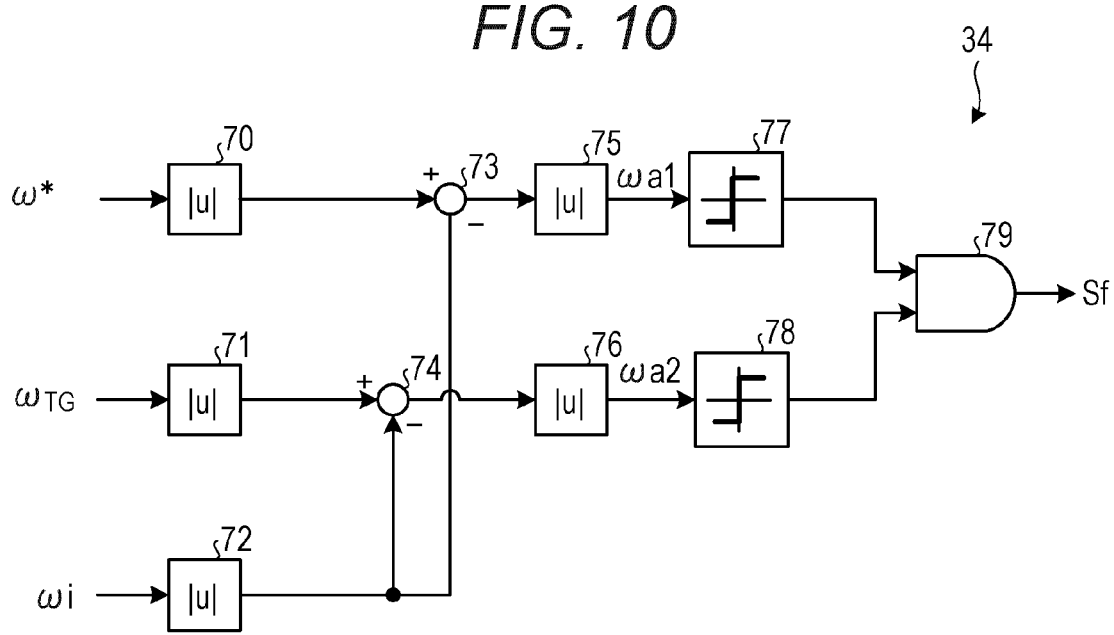
FIG. 10 is a diagram illustrating an exemplary configuration of an output frequency determiner illustrated in FIG. 6.

The output frequency determiner 34 outputs the frequency determination signal Sf corresponding to the difference between the output frequency command $\omega^*$ and the input frequency $\omega i$. FIG. 10 is a diagram illustrating an exemplary configuration of the output frequency determiner 34. As illustrated in FIG. 10, the output frequency determiner 34 includes absolute-value operators 70 to 72, 75, and 76, subtractors 73 and 74, comparators 77 and 78, and a logical multiplier (AND circuit) 79.

The absolute-value operator 70 computes the absolute value of the output frequency command $\omega^*$. Accordingly, in the case where the polarity of the output frequency command $\omega^*$ is a negative polarity, the polarity of the output frequency command $\omega^*$ becomes a positive polarity. The absolute-value operator 70 outputs the output frequency command $\omega^*$ with the positive polarity to the subtractor 73.

The absolute-value operator 71 computes the absolute value of the set frequency $\omega_{TG}$. Accordingly, in the case where the polarity of the set frequency $\omega_{TG}$ is a negative polarity, the polarity of the set frequency $\omega_{TG}$ becomes a positive polarity. The absolute-value operator 71 outputs the set frequency $\omega_{TG}$ with the positive polarity to the subtractor 74.

The absolute-value operator 72 computes the absolute value of the input frequency $\omega i$. Accordingly, in the case where the polarity of the input frequency $\omega i$ is a negative polarity, the polarity of the input frequency $\omega i$ becomes a positive polarity. The absolute-value operator 72 outputs the input frequency $\omega i$ with the positive polarity to the subtractors 73 and 74.

The subtractor 73 subtracts the input frequency $\omega i$ with the positive polarity from the output frequency command $\omega^*$ with the positive polarity so as to output the subtraction result to the absolute-value operator 75. The absolute-value operator 75 computes the absolute value of the subtraction result by the subtractor 73. Accordingly, a frequency difference $\omega a1$ (=$|\omega^* - \omega i|$) that is the absolute value of the difference between the output of the absolute-value operator 70 and the output of the absolute-value operator 72 is computed.

The subtractor 74 subtracts the input frequency $\omega i$ with the positive polarity from the set frequency $\omega_{TG}$ with the positive polarity so as to output the subtraction result to the absolute-value operator 76. The absolute-value operator 76 computes the absolute value of the subtraction result by the subtractor 74. Accordingly, a frequency difference $\omega a2$ (=$|\omega_{TG} - \omega i|$) that is the absolute value of the difference between the output of the absolute-value operator 71 and the output of the absolute-value operator 72 is computed.

The computation result of the absolute-value operator 75 is output to the logical multiplier 79 through the comparator 77. The computation result of the absolute-value operator 76 is output to the logical multiplier 79 through the comparator 78. To the comparators 77 and 78, a comparison value $\omega_{HC}$ is set. Here, the comparison value $\omega_{HC}$ is a set parameter, and is set, for example, by the user of the matrix converter 1 through an input unit (not illustrated).

In the case where the frequency difference $\omega a1$ is equal to or less than the comparison value $\omega_{HC}$, the comparator 77 outputs a signal at High level. In the case where the frequency difference $\omega a1$ exceeds the comparison value $\omega_{HC}$, the comparator 77 outputs a signal at Low level. Additionally, in the case where the frequency difference $\omega a2$ is equal to or less than the comparison value $\omega_{HC}$, the comparator 78 outputs a signal at High level. In the case where the frequency difference $\omega a2$ exceeds the comparison value $\omega_{HC}$, the comparator 78 outputs a signal at Low level. Here, the comparator 77 and 78 may be set to have hysteresis characteristics.

In the case where the comparators 77 and 78 both output the signals at High level, the logical multiplier 79 outputs the frequency determination signal Sf indicative of frequency coincidence at High level. On the other hand, in the case where any of the comparators 77 and 78 outputs a signal at Low level, the logical multiplier 79 outputs the frequency determination signal Sf (an exemplary frequency non-coincidence signal) indicative of frequency non-coincidence at Low level.

Figure 11:
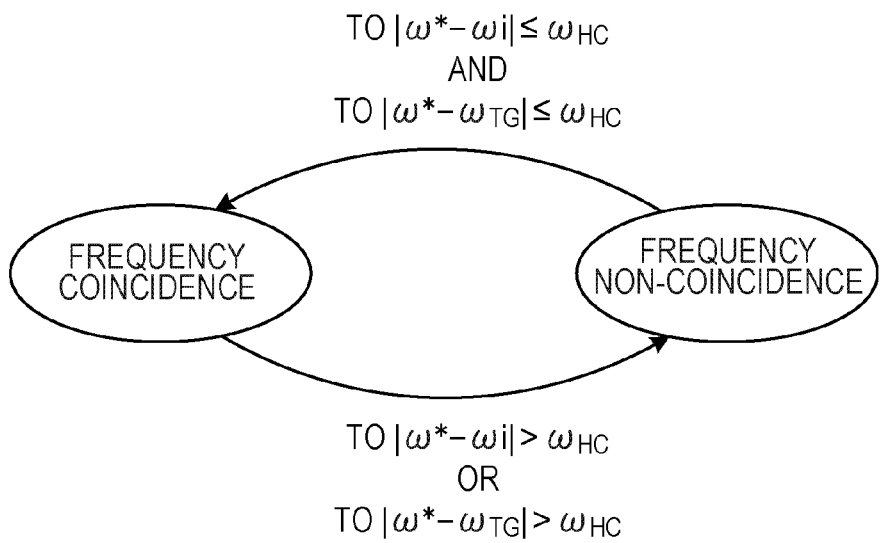
FIG. 11 is a diagram illustrating state transitions of a frequency determination signal.

FIG. 11 is a diagram illustrating state transitions of the frequency determination signal Sf. As illustrated in FIG. 11, in the case where $|\omega^*-\omega i|\leq\omega_{HC}$ and $|\omega^*-\omega_{TG}|\leq\omega_{HC}$, the frequency determination signal Sf becomes the state indicative of frequency coincidence from the state indicative of frequency non-coincidence. On the other hand, in the case where $|\omega^*-\omega i|>\omega_{HC}$ or $|\omega^*-\omega_{TG}|>\omega_{HC}$, the frequency determination signal Sf becomes the state indicative of frequency non-coincidence from the state indicative of frequency coincidence. Here, $\omega_{HC}$ is set to, for example, 1.5 Hz.

Thus, in the case where the difference between the input frequency ωi and the output frequency command ω* is within a predetermined range and in the case where the difference between the input frequency wi and the set frequency $\omega_{TG}$ is within a predetermined range, the output frequency determiner 34 determines the frequency coincidence state.

In the output frequency determiner 34, giving hysteresis characteristics to the comparators 77 and 78 allows reducing hunting of the mode transition in the case where the input frequency ωi is not stable. For example, in the case where the input frequency ωi instantaneously decreases in the output frequency determiner 34, this suppresses the determination of the frequency coincidence state or the frequency non-coincidence state.

Here, in the case where the difference between the input frequency ωi and the output frequency command ω* is within a predetermined range regardless of the state of the set frequency $\omega_{TG}$, the output frequency determiner 34 can determine the frequency coincidence state. In this case, the output frequency determiner 34 needs not to include the absolute-value operators 71 and 76, the subtractor 74, the comparator 78, and the logical multiplier (AND circuit) 79. In this case, in the output frequency determiner 34, the output of the comparator 77 is set to the frequency determination signal Sf.

(5. Configuration of Output Voltage Determiner 35)

Figure 12:
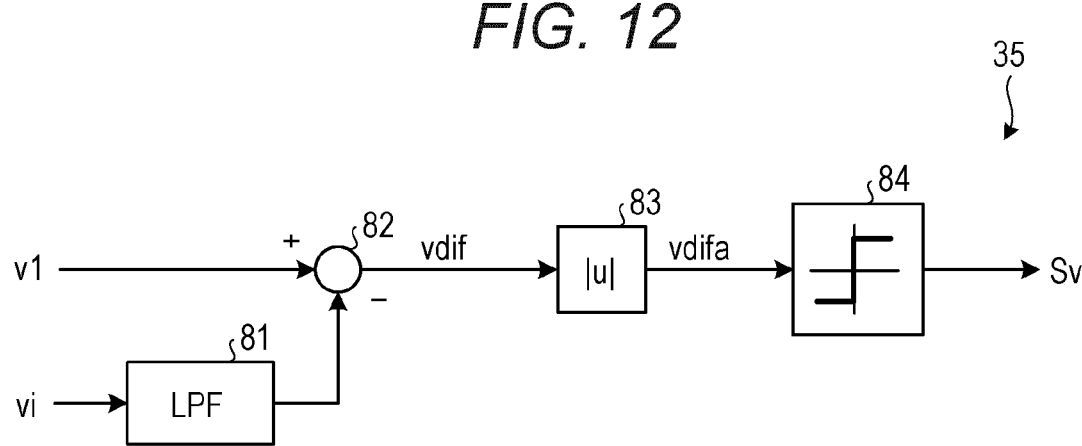
FIG. 12 is a diagram illustrating an exemplary configuration of an output voltage determiner illustrated in FIG. 6.

The output voltage determiner 35 outputs the voltage determination signal Sv corresponding to the difference between the output-voltage-command amplitude v1 and the input voltage amplitude vi. FIG. 12 is a diagram illustrating an exemplary configuration of the output voltage determiner 35. As illustrated in FIG. 12, the output voltage determiner 35 includes a low-pass filter (LPF) 81, a subtractor 82, an absolute-value operator 83, and a comparator 84.

The low-pass filter 81 outputs the input voltage amplitude vi to the subtractor 82 after removing the high-frequency component of the input voltage amplitude vi. The subtractor 82 obtains a difference value vdif between the output-voltage-command amplitude v1 and the input voltage amplitude vi after the high-frequency component is removed, and outputs the difference value vdif to the absolute-value operator 83.

The absolute-value operator 83 obtains and outputs a voltage amplitude difference vdifa that is the absolute value of the difference value vdif to the comparator 84. To the comparator 84, a comparison value $v_{HC}$ is set. The comparison value $v_{HC}$ is a set parameter, and is set, for example, by the user of the matrix converter 1 through an input unit (not illustrated).

In the case where the voltage amplitude difference vdifa becomes equal to or less than the comparison value $v_{HC}$, the comparator 84 outputs the voltage determination signal Sv indicative of voltage coincidence at High level. In the case where the voltage amplitude difference vdifa exceeds the comparison value $v_{HC}$, the comparator 84 outputs the voltage determination signal Sv indicative of voltage non-coincidence at Low level. Here, as illustrated in FIG. 12, the comparator 84 may have a hysteresis characteristic.

Figure 13:
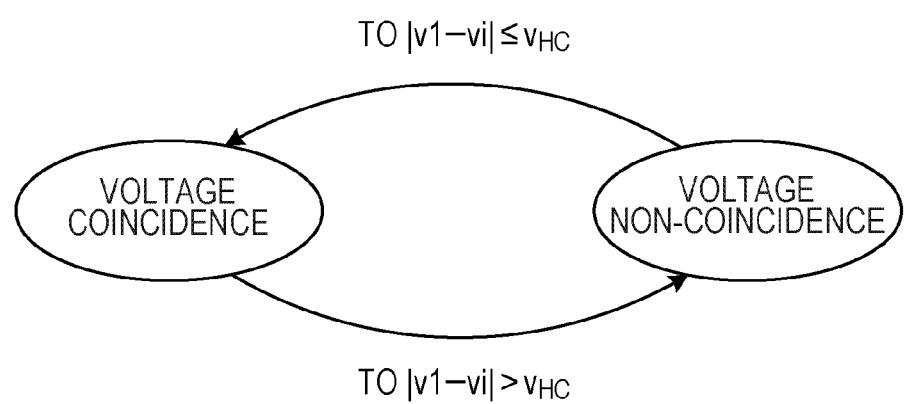
FIG. 13 is a diagram illustrating state transitions of a voltage-amplitude determination signal.

FIG. 13 is a diagram illustrating state transitions of the voltage determination signal Sv. As illustrated in FIG. 13, in the case where vdifa (=|v1−vi|)≤$v_{HC}$, the voltage determination signal Sv becomes the state indicative of voltage coincidence from the state indicative of voltage non-coincidence. On the other hand, in the case where vdifa (=|v1−vi|)>$v_{HC}$, the voltage determination signal Sv becomes the state indicative of voltage non-coincidence from the state indicative of voltage coincidence. Thus, in the case where the difference between the input voltage amplitude vi and the output-voltage-command amplitude v1 is within a predetermined range, the output voltage determiner 35 determines the voltage coincidence state.

(6. Configuration of Output Phase Determiner 36)

Figure 14:
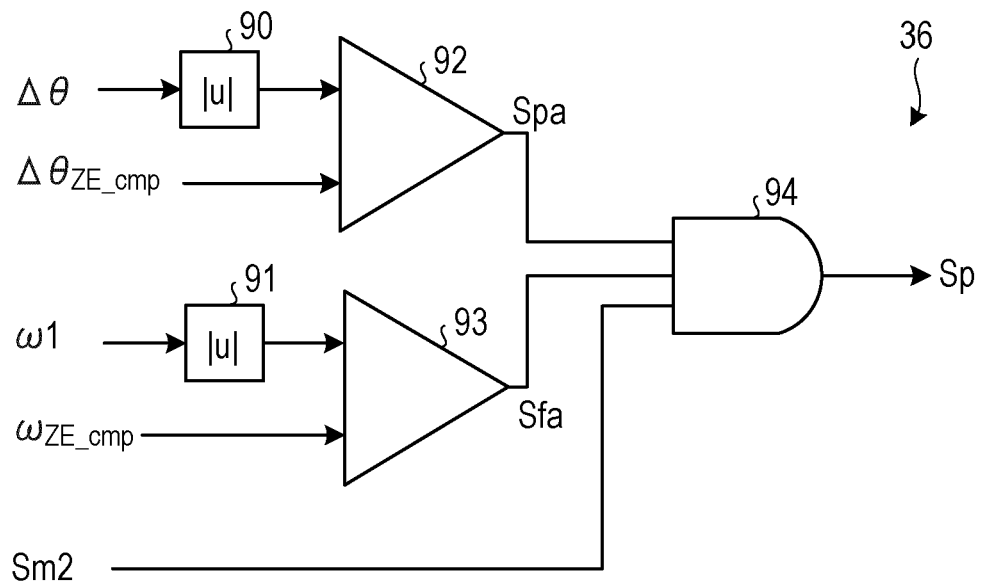
FIG. 14 is a diagram illustrating an exemplary configuration of an output phase determiner illustrated in FIG. 6.

In the first transition mode, the output phase determiner 36 outputs the phase determination signal Sp corresponding to the difference between the absolute value of the phase variation amount Δθ and the phase threshold $\Delta\theta_{ZE\_cmp}$. FIG. 14 is a diagram illustrating an exemplary configuration of the output phase determiner 36. As illustrated in FIG. 14, the output phase determiner 36 includes absolute-value operators 90 and 91, comparators 92 and 93, and a logical multiplier (AND circuit) 94.

The absolute-value operator 90 computes the absolute value of the phase variation amount Δθ and outputs the computation result to the comparator 92. The absolute-value operator 91 computes the absolute value of the virtual output frequency ω1 and outputs the computation result to the comparator 93.

The comparator 92 compares the absolute value of the phase variation amount Δθ with the phase threshold $\Delta\theta_{ZE\_cmp}$. The comparator 92 outputs a phase difference signal Spa at High level in the case where $\Delta\theta\leq\Delta\theta_{ZE\_cmp}$, and outputs the phase difference signal Spa at Low level in the case where $\Delta\theta>\Delta\theta_{ZE\_cmp}$. The phase threshold $\Delta\theta_{ZE\_cmp}$ is a set parameter, and is set, for example, by the user of the matrix converter 1 through an input unit (not illustrated).

The comparator 93 compares the absolute value of the virtual output frequency ω1 with a frequency threshold $\omega_{ZE\_cmp}$. The comparator 93 outputs a frequency difference signal Sfa at High level in the case where $\omega 1\leq\omega_{ZE\_cmp}$, and outputs the frequency difference signal Sfa at Low level in the case where $\omega 1>\omega_{ZE\_cmp}$. The frequency threshold $\omega_{ZE\_cmp}$ is a set parameter, and is set, for example, by the user of the matrix converter 1 through an input unit (not illustrated).

The logical multiplier 94 receives inputs of the phase difference signal Spa, the frequency difference signal Sfa, and the mode selection signal Sm2. In the case where these signals Spa, Sfa, and Sm2 are all at High level, the logical multiplier 94 outputs the phase determination signal Sp (an exemplary phase coincidence signal) indicative of phase coincidence at High level. On the other hand, in the case where any of these signals Spa, Sfa, and Sm2 is at Low level, the logical multiplier 94 outputs the phase determination signal Sp indicative of phase non-coincidence at Low level.

Thus, in the first transition mode, when the difference between the input phase θi and the virtual output phase θ1 is equal to or less than the phase threshold $\Delta\theta_{ZE\_cmp}$ and the virtual output frequency ω1 becomes equal to or less than the frequency threshold $\omega_{ZE\_cmp}$, the output phase determiner 36 outputs the phase determination signal Sp indicative of phase coincidence.

Setting the condition that the virtual output frequency ω1 is equal to or less than the frequency threshold $\omega_{ZE\_cmp}$ allows reducing the output of the phase determination signal Sp indicative of phase coincidence even though the PI controller 63 is in the transient state.

Here, the output phase determiner 36 may have a configuration that does not include the absolute-value operator 91 and the comparator 93. In this case, the output phase determiner 36 outputs the phase determination signal Sp indicative of phase coincidence at High level in the case where the phase difference signal Spa and the mode selection signal Sm2 are both at High level.

(7. Configuration of Mode-Switching Determiner 37)

Figure 15:
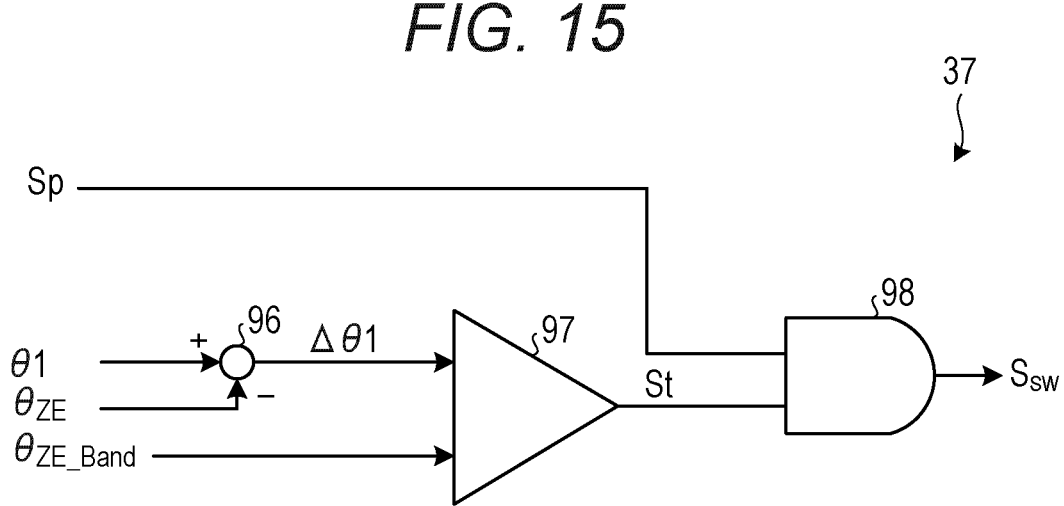
FIG. 15 is a diagram illustrating an exemplary configuration of a mode-switching determiner illustrated in FIG. 6.

FIG. 15 is a diagram illustrating an exemplary configuration of the mode-switching determiner 37. As illustrated in FIG. 15, the mode-switching determiner 37 includes a subtractor 96, a comparator 97, and a logical multiplier (AND circuit) 98.

The subtractor 96 subtractions a phase $\theta_{ZE}$ (=nπ/6; n is one or more integers from 1 to 12) from the virtual output phase θ1, and outputs a subtraction result A01 to the comparator 97. The comparator 97 compares the subtraction result 401 of the subtractor 96 with a phase threshold $\theta_{ZE\_Band}$. In the case where $\Delta\theta 1 \leq \theta_{ZE\_Band}$, the comparator 97 outputs a timing determination signal St at High level to the logical multiplier 98. In the case where $\Delta\theta 1 > \theta_{ZE\_Band}$, the comparator 97 outputs the timing determination signal St at Low level to the logical multiplier 98.

In the case where the timing determination signal St and the phase determination signal Sp are both at High level, the logical multiplier 98 outputs the mode switching signal Ssw indicative of a switching instruction at High level. Otherwise, the logical multiplier 98 outputs the mode switching signal Ssw indicative of switching wait at Low level.

Thus, in the case where the output phase determiner 36 outputs the phase determination signal Sp indicative of phase coincidence, when the output phase θo is within a range from $n\pi/6-\theta_{ZE\_Band}$ to $n\pi/6+\theta_{ZE\_Band}$, the mode-switching determiner 37 outputs the mode switching signal Ssw indicative of a switching instruction.

As described above, the matrix converter 1 according to this embodiment performs the voltage increase control and the phase follow-up control in the case where the difference between the output frequency ωo (the output frequency command ω*) and the input frequency ωi becomes within the predetermined range. In the case where these controls terminate, the matrix converter 1 makes the transition of the mode for driving the bidirectional switch S from the PWM control mode to the directly combined control mode. This allows providing the matrix converter 1 that can reduce occurrence of a shock in the output electric current Io and improve the voltage use rate.

Here, in the above description, "High level" is described as one example of the state of the signal indicative of frequency coincidence, voltage coincidence, and similar state. Instead, "Low level" may be used for the state of the signal indicative of frequency coincidence, voltage coincidence, and similar state.

The above-described follow-up phase operator 66 generates and outputs the phase adjustment amount θaj corresponding to the difference between the output frequency command ω* and the input frequency ωi. Instead, the follow-up phase operator 66 may generate the phase adjustment amount θaj without using the output frequency command ω*. In this case, the follow-up phase operator 66 does not include the absolute-value operator 111, the multiplier 114, and the adder 115.

Here, the power converter 10 is exemplary power conversion means. The controller 14 is exemplary control means.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general concept of the disclosure as defined by the appended claims and their equivalents.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A matrix converter, comprising:
a power converter that includes a plurality of bidirectional switches configured to couple respective phases of an AC power supply and respective phases of a load together; and
a controller configured to selectively execute:
a first control mode in which the controller is configured to perform power conversion between the AC power supply and the load by performing a PWM control on the plurality of bidirectional switches; and
a second control mode in which the controller is configured to directly combine the AC power supply with the load by controlling the plurality of bidirectional switches, wherein
the controller is configured to:
perform a voltage increase control and a follow-up control in response to a determination that a difference between a frequency of an output voltage from the power converter to the load and a frequency of the AC power supply is within a predetermined range, the voltage increase control increasing the output voltage, the follow-up control causing a phase of the output voltage to follow a voltage phase of the AC power supply; and
make a transition of a mode for driving the plurality of bidirectional switches from the first control mode to the second control mode in a case where the voltage increase control and the follow-up control terminate.

2. A matrix converter comprising:
a power converter that includes a plurality of bidirectional switches configured to couple respective phases of an AC power supply and respective phases of a load together; and
a controller configured to selectively execute:
a first control mode in which the controller is configured to perform power conversion between the AC power supply and the load by performing a PWM control on the plurality of bidirectional switches; and
a second control mode in which the controller is configured to directly combine the AC power supply with the load by controlling the plurality of bidirectional switches, wherein
the controller is configured to:

perform a voltage increase control and a follow-up control in a case where a difference between a frequency of an output voltage from the power converter to the load and a frequency of the AC power supply becomes within a predetermined range, the voltage increase control increasing the output voltage, the follow-up control causing a phase of the output voltage to follow a voltage phase of the AC power supply; and make a transition of a mode for driving the plurality of bidirectional switches from the first control mode to the second control mode in a case where the voltage increase control and the follow-up control terminate, wherein the controller further includes:
   a frequency determiner configured to output a frequency coincidence signal in a case where the difference between the frequency of the output voltage and the frequency of the AC power supply is within the predetermined range;
   a voltage-limitation controller configured to perform the voltage increase control in a case where the frequency coincidence signal is output from the frequency determiner;
   a voltage determiner configured to output a voltage coincidence signal in a case where a difference between an amplitude of the output voltage and a voltage amplitude of the AC power supply is within a predetermined range;
   a phase operator configured to perform the follow-up control in a case where the frequency coincidence signal is output from the frequency determiner;
   a phase determiner configured to output a phase coincidence signal in a case where a difference between the phase of the output voltage and the voltage phase of the AC power supply is within a predetermined range; and
   a switch driver configured to make a transition of the mode for driving the plurality of bidirectional switches from the first control mode to the second control mode in a case where the matrix converter outputs the voltage coincidence signal and outputs the phase coincidence signal.

3. The matrix converter according to claim 2, wherein the controller further includes a mode-switching determination device configured to output a mode switching signal in a case where a difference between the phase of the output voltage and $n\pi/6$ (n is one or more integers from 1 to 12) is within a predetermined range in a state where the matrix converter outputs the frequency coincidence signal, the voltage coincidence signal, and the phase coincidence signal, and the switch driver is configured to make a transition of the mode for driving the plurality of bidirectional switches from the first control mode to the second control mode at a time when the mode switching signal is output from the mode-switching determination device.

4. The matrix converter according to claim 2, wherein the phase operator is configured to terminate the follow-up control after termination of the voltage increase control by the voltage-limitation controller.

5. The matrix converter according to claim 2, wherein the controller further includes:
   a frequency-command generation device configured to generate a frequency command such that the frequency of the output voltage approaches a set frequency as time passes; and
   a voltage-command generator configured to generate a voltage command for controlling the output voltage based on the frequency command, and
the switch driver is configured to perform the PWM control based on the voltage command.

6. The matrix converter according to claim 5, wherein the voltage-limitation controller includes:
   a limiter configured to limit a magnitude of the voltage command; and
   a voltage-limitation remover configured to remove limitation on the voltage command by the limiter in phases in a case where the frequency coincidence signal is output from the frequency determiner.

7. The matrix converter according to claim 5, wherein the frequency determiner is configured to output the frequency coincidence signal in a case where the difference between the frequency of the AC power supply and the frequency of the output voltage is within the predetermined range and a difference between the frequency command and the frequency of the AC power supply is within a predetermined range.

8. The matrix converter according to claim 5, wherein the phase operator includes:
   a virtual phase operator configured to configured to compute a virtual phase of the output voltage so as to reduce the difference between the voltage phase of the AC power supply and the phase of the output voltage;
   a compensation-value operator configured to compute a phase compensation value by adding the frequency of the AC power supply and the frequency command while changing ratios of the frequency of the AC power supply and the frequency command such that the ratio of the frequency of the AC power supply increases as time passes; and
   a phase compensator configured to calculate the phase of the output voltage by adding the phase compensation value to the virtual phase, and
the switch driver is configured to perform the PWM control based on the voltage command output from the voltage-command generator and the phase of the output voltage calculated by the phase operator.

9. The matrix converter according to claim 8, wherein the controller further includes a phase detector configured to detect the voltage phase of the AC power supply, wherein
the phase operator includes:
   a phase replacer configured to replace a rotation direction of the voltage phase of the AC power supply by a predetermined direction and output a result of the replacement to the virtual phase operator in a case where the rotation direction of the voltage phase of the AC power supply output from the phase detector is not the predetermined direction; and
   a phase inverse replacer configured to replace the rotation direction of the phase of the output voltage calculated by the phase compensator by an opposite direction of the rotation direction in a case where the phase replacer has converted the rotation direction of the voltage phase of the AC power supply into the predetermined direction.

10. The matrix converter according to claim 5, wherein the switch driver is configured to make a transition of the mode for driving the plurality of bidirectional switches from the second control mode to the first control mode in a case where a difference between the set frequency and the frequency of the AC power supply is out of a predetermined range.

11. The matrix converter according to claim 10, wherein
in a state where the frequency determiner is outputting the frequency coincidence signal in a case where the difference between the set frequency and the frequency of the AC power supply becomes out of a predetermined range, the frequency determiner stops the output of the frequency coincidence signal,
in a case where the output of the frequency coincidence signal stops, the voltage-limitation controller performs a voltage decrease control that decreases the output voltage to a predetermined voltage,
in a case where the output of the frequency coincidence signal stops, the phase operator performs a phase follow-up stop control that makes a transition of the phase of the output voltage from a state coincident with the voltage phase of the AC power supply to a state of non-coincidence, and
in a case where the set frequency decreases, the frequency-command generation device generates the frequency command such that the frequency of the output voltage approaches the set frequency as time passes on a condition that the voltage decrease control and the phase follow-up stop control terminate.

12. The matrix converter according to claim 10, wherein
in a case where the output of the frequency coincidence signal stops, the phase operator performs a phase follow-up stop control that makes a transition of the phase of the output voltage from a state coincident with the voltage phase of the AC power supply to a state of non-coincidence.

13. A matrix converter, comprising:
a power converter that includes a plurality of bidirectional switches configured to couple respective phases of an AC power supply and respective phases of a load together; and
a controller configured to selectively execute:
  a first control mode in which the controller is configured to perform power conversion between the AC power supply and the load by performing a PWM control on the plurality of bidirectional switches; and
  a second control mode in which the controller is configured to directly combine the AC power supply and the load by controlling the plurality of bidirectional switches, wherein
in a state where the controller is controlling the plurality of bidirectional switches in the second control mode, in response to a determination that a difference between: a set frequency that is a target value of a frequency of an output voltage from the power converter to the load, and a frequency of the AC power supply is out of a predetermined range, the controller makes a transition to the first control mode and performs a voltage decrease control that decreases the output voltage to a predetermined voltage and a phase follow-up stop control that makes a transition of a phase of the output voltage from a state coincident with a voltage phase of the AC power supply to a state of non-coincidence.

14. A matrix converter comprising:
a power converter that includes a plurality of bidirectional switches configured to couple respective phases of an AC power supply and respective phases of a load together; and
a controller configured to selectively execute:
  a first control mode in which the controller is configured to perform power conversion between the AC power supply and the load by performing a PWM control on the plurality of bidirectional switches; and
  a second control mode in which the controller is configured to directly combine the AC power supply and the load by controlling the plurality of bidirectional switches, wherein
in a state where the controller is controlling the plurality of bidirectional switches in the second control mode, in a case where a difference between: a set frequency that is a target value of a frequency of an output voltage from the power converter to the load, and a frequency of the AC power supply becomes out of a predetermined range, the controller makes a transition to the first control mode and performs a voltage decrease control that decreases the output voltage to a predetermined voltage and a phase follow-up stop control that makes a transition of a phase of the output voltage from a state coincident with a voltage phase of the AC power supply to a state of non-coincidence, wherein
the controller further includes:
  a frequency-command generation device configured to generate a frequency command such that the frequency of the output voltage approaches a set frequency as time passes;
  a voltage-command generator configured to generate a voltage command for controlling the output voltage based on the frequency command;
  a frequency determiner configured to:
    output a frequency coincidence signal in a case where the difference between the set frequency and the frequency of the AC power supply is within the predetermined range; and
    stop the output of the frequency coincidence signal in a case where the difference between the set frequency and the frequency of the AC power supply becomes out of the predetermined range;
  a voltage-limitation controller configured to perform the voltage decrease control in a case where the output of the frequency coincidence signal stops; and
  a phase operator configured to perform the phase follow-up stop control in a case where the output of the frequency coincidence signal stops, and
in a case where the set frequency decreases, the frequency-command generation device generates the frequency command such that the frequency of the output voltage approaches the set frequency as time passes on a condition that the voltage decrease control and the phase follow-up stop control terminate.

15. The matrix converter according to claim 2, wherein
in the second control mode, the switch driver is configured to control the bidirectional switch using a switch control pattern corresponding to a rotation direction of the voltage phase of the AC power supply and a rotation direction of the phase of the output voltage.

16. A matrix converter, comprising control means for selectively executing:
a first control mode in which the control means is configured to perform power conversion between an AC power supply and a load by performing a PWM control on a plurality of bidirectional switches configured to couple respective phases of the AC power supply and respective phases of the load together; and a second control mode in which the control means is configured to directly combine the AC power supply and the load by controlling the plurality of bidirectional switches, wherein the control means is configured to:
- perform a voltage increase control and a follow-up control in response to a determination that a difference between a frequency of an output voltage from the power conversion means to the load and a frequency of the AC power supply is within a predetermined range, the voltage increase control increasing the output voltage, the follow-up control causing a phase of the output voltage to follow a voltage phase of the AC power supply; and
- make a transition of a mode for driving the plurality of bidirectional switches from the first control mode to the second control mode in a case where the voltage increase control and the follow-up control terminate.

17. The matrix converter according to claim 1, wherein the controller includes a frequency determiner configured to determine when the difference between the frequency of the output voltage and the frequency of the AC power supply is within the predetermined range.

18. The matrix converter according to claim 13, wherein the controller includes a frequency determiner configured to determine when the difference between the set frequency and the frequency of the AC power supply is out of the predetermined range.

19. The matrix converter according to claim 16, wherein the control means is further configured to determine when the difference between the frequency of the output voltage and the frequency of the AC power supply is within the predetermined range.

\* \* \* \* \*